US008583687B1

(12) United States Patent
Piedmonte et al.

(10) Patent No.: US 8,583,687 B1
(45) Date of Patent: Nov. 12, 2013

(54) SYSTEMS AND METHODS FOR INDIRECT ALGEBRAIC PARTITIONING

(75) Inventors: Christopher M. Piedmonte, Ceder Park, TX (US); William A. Rogers, Austin, TX (US)

(73) Assignee: Algebraix Data Corporation, Austin, TX (US)

( * ) Notice: Subject to any disclaimer, the term of this patent is extended or adjusted under 35 U.S.C. 154(b) by 0 days.

(21) Appl. No.: 13/472,271

(22) Filed: May 15, 2012

(51) Int. Cl.
G06F 17/30 (2006.01)

(52) U.S. Cl.
USPC ........... 707/776; 707/736; 707/737; 707/769; 707/802

(58) Field of Classification Search
USPC .................... 707/776, 736, 737, 769, 802
See application file for complete search history.

(56) References Cited

U.S. PATENT DOCUMENTS

| 4,290,115 A | 9/1981 | Pitt et al. |
| 4,925,311 A | 5/1990 | Neches et al. |
| 4,945,471 A | 7/1990 | Neches |
| 4,956,772 A | 9/1990 | Neches |
| 5,006,978 A | 4/1991 | Neches |
| 5,303,244 A | 4/1994 | Watson |
| 5,321,813 A | 6/1994 | McMillen et al. |
| 5,511,190 A | 4/1996 | Sharma et al. |
| 5,588,129 A | 12/1996 | Ballard |
| 5,625,815 A | 4/1997 | Maier et al. |
| 5,717,911 A | 2/1998 | Madrid et al. |
| 5,740,433 A | 4/1998 | Carr et al. |
| 5,740,434 A | 4/1998 | Eastep |
| 5,745,753 A | 4/1998 | Mosher, Jr. |
| 5,778,354 A | 7/1998 | Leslie et al. |
| 5,794,252 A | 8/1998 | Bailey et al. |
| 5,799,322 A | 8/1998 | Mosher, Jr. |
| 5,819,255 A | 10/1998 | Celis et al. |
| 5,822,747 A | 10/1998 | Graefe et al. |
| 5,835,915 A | 11/1998 | Carr et al. |

(Continued)

FOREIGN PATENT DOCUMENTS

| CA | 2150745 | 12/1996 |
| WO | WO 2007/134278 A2 | 11/2007 |
| WO | WO 2007/134278 A3 | 11/2007 |

OTHER PUBLICATIONS

Agrawal, S., et al "Automated Selection of Materialized Views and Indexes for AQL Databases" Jan. 1, 2000, pp. 496-505, Cairo, Egypt 2000.

(Continued)

*Primary Examiner* — Shahid Alam
*Assistant Examiner* — Nargis Sultana
(74) *Attorney, Agent, or Firm* — Wilson Sonsini Goodrich & Rosati

(57) ABSTRACT

Systems and methods for storing and accessing data. Example embodiments may perform optimization based on patterns of requests received by the system and relations between data sets identified by the system. Example embodiments may identify restrictions on a data set based on a different data set. Conditions for automatically algebraically partitioning the data set based on a constituent of a different data set may be evaluated, including evaluation of the relationship between the data sets and identification of a pattern of statements restricting the data set using the same logical structure. If the conditions are met, component data sets and a partition data set may be algebraically defined based on ranges applied to constituent(s) of the other data set. The component data sets may also be realized in storage to physically partition the data set.

32 Claims, 10 Drawing Sheets

(56) References Cited

U.S. PATENT DOCUMENTS

| | | | |
|---|---|---|---|
| 5,884,328 A | | 3/1999 | Mosher, Jr. |
| 5,970,495 A | * | 10/1999 | Baru et al. ............................ 1/1 |
| 5,987,453 A | | 11/1999 | Krishna et al. |
| 6,021,405 A | | 2/2000 | Celis et al. |
| 6,032,144 A | | 2/2000 | Srivastava et al. |
| 6,061,676 A | | 5/2000 | Srivastava et al. |
| 6,076,152 A | | 6/2000 | Huppenthal et al. |
| 6,105,033 A | | 8/2000 | Levine |
| 6,161,103 A | | 12/2000 | Rauer et al. |
| 6,327,587 B1 | | 12/2001 | Forster |
| 6,449,605 B1 | | 9/2002 | Witkowski |
| 6,460,027 B1 | | 10/2002 | Cochrane et al. |
| 6,484,247 B1 | | 11/2002 | Gendron et al. |
| 6,516,310 B2 | | 2/2003 | Paulley |
| 6,529,903 B2 | | 3/2003 | Smith et al. |
| 6,601,058 B2 | | 7/2003 | Forster et al. |
| 6,615,209 B1 | | 9/2003 | Gomes et al. |
| 6,621,612 B2 | | 9/2003 | Chan et al. |
| 6,658,423 B1 | | 12/2003 | Pugh et al. |
| 6,678,681 B1 | | 1/2004 | Brin |
| 6,865,575 B1 | | 3/2005 | Smith et al. |
| 6,910,044 B2 | * | 6/2005 | Weinberg et al. ............. 707/792 |
| 6,931,390 B1 | | 8/2005 | Zait et al. |
| 7,080,101 B1 | | 7/2006 | Watson et al. |
| 7,240,078 B2 | | 7/2007 | Cheng et al. |
| 7,254,810 B2 | | 8/2007 | Barsness et al. |
| 7,447,679 B2 | | 11/2008 | Shankar et al. |
| 7,464,867 B1 | | 12/2008 | Kolls |
| 7,613,734 B2 | * | 11/2009 | Piedmonte ............................ 1/1 |
| 7,720,806 B2 | * | 5/2010 | Piedmonte .................... 707/719 |
| 7,725,444 B2 | | 5/2010 | Devarakonda et al. |
| 7,730,042 B2 | | 6/2010 | Devarakonda et al. |
| 7,769,754 B2 | * | 8/2010 | Piedmonte .................... 707/736 |
| 7,797,319 B2 | * | 9/2010 | Piedmonte .................... 707/736 |
| 7,865,503 B2 | | 1/2011 | Piedmonte |
| 7,877,370 B2 | * | 1/2011 | Piedmonte .................... 707/708 |
| 8,032,509 B2 | * | 10/2011 | Piedmonte .................... 707/708 |
| 8,051,184 B2 | * | 11/2011 | Roberts ........................ 709/228 |
| 8,380,695 B2 | * | 2/2013 | Piedmonte .................... 707/707 |
| 2002/0087361 A1 | | 7/2002 | Benigno et al. |
| 2002/0087510 A1 | * | 7/2002 | Weinberg et al. ............. 707/705 |
| 2003/0105925 A1 | | 6/2003 | Yoshimura et al. |
| 2004/0054648 A1 | | 3/2004 | Mogi et al. |
| 2004/0122845 A1 | | 6/2004 | Lohman et al. |
| 2007/0022093 A1 | | 1/2007 | Wyatt et al. |
| 2010/0082541 A1 | | 4/2010 | Kottomtharayil |
| 2010/0121877 A1 | * | 5/2010 | Fawcett et al. ................. 707/769 |
| 2010/0125553 A1 | | 5/2010 | Huang et al. |
| 2013/0006965 A1 | * | 1/2013 | Barbas .......................... 707/718 |

OTHER PUBLICATIONS

Angus, J., "Fast, Scalable Data Mart Maker," Information week, Feb. 8, 1999.

Champion, M., "The Feasibility of an Operation-Centric Environment for Processing XML Documents," Jan. 26, 2001, pp. 1-4 (printed Feb. 20, 2008 from http://xsp.xegesis.org/).

Champion, M., "XSP: An Integration Technology for Systems Development and Evolution Formal Specifications for Unifying XML and Relational Systems," Jul. 12, 2001, pp. 1-19 (printed Feb. 20, 2008 from http://xsp.xegesis.org/).

Childs, D. L., "Adaptive Data Restructuring Functions," Sep. 8, 2002 (printed Feb. 20, 2008 from http://xsp.xegesis.org/).

Childs, D. L., "Axiomatic Extended Set Theory," Jun. 11, 2002 (printed Feb. 20, 2008 from http://xsp.xegesis.org/).

Childs, D. L., "Data Warehouse or Information Black Hole?" Mar. 6, 2007 (printed Feb. 20, 2008 from http://xsp.xegesis.org/).

Childs, D. L., "Extended Set Theory a General Model for Very Large, Distributed, Backend Information Systems," $3^{rd}$ International Conference on Very Large Data Bases, Oct. 6-8, 1977, pp. 28-46, Tokyo, Japan.

Childs, D. L., "Feasibility of a Set-Theoretic Data Structure a General Structure Based on a Reconstituted Definition of Relation," Proceedings of IFIP Congress, Aug. 5-10, 1968, pp. 420-430, vol. 1, Edinburgh, Amsterdam.

Childs, D. L., "Introduction to a Mathematical Foundation for Systems Development," NATO ASI Series, Database Machines, 1986, pp. 217-255, vol. F24, Springer-Verlag Berlin Heidelberg.

Childs, D. L., "Modeling Data Processing Implementations," Apr. 3, 2006 (printed Feb. 20, 2008 from http://xsp.xegesis.org/).

Childs, D. L., "Modeling Data Processing Implementations," Jun. 8, 2002 (printed Feb. 20, 2008 from http://xsp.xegesis.org/).

Childs, D. L., "Pebble Piles & Index Structures," Aug. 8, 2005 (printed Feb. 20, 2008 from http://xsp.xegesis.org/).

Childs, D. L., "Rapid Response Transaction Processing," Mar. 2, 2005, pp. 1-2 (printed Feb. 20, 2008 from http://xsp.xegesis.org/).

Childs, D. L., "RDM-Relations & XML-Structures as Xsets," Jul. 9, 2002, pp. 1-3 (printed Feb. 20, 2008 from http://xsp.xegesis.org/).

Childs, D. L., "What is XSP?" Aug. 8, 2005 (printed Feb. 20, 2008 from http://xsp.xegesis.org/).

Childs, D. L., "XSP Technology for XML Systems Design and Development," Nov. 29, 2000, pp. 1-30.

Childs, D. L., "XSP Technology: A Foundation for Integrated Information Access Systems," Jun. 20, 2002 (printed Feb. 20, 2008 from http://xsp.xegesis.org/).

Childs, D. L., "XST Notes: Tuplesets, Tagged-Sets, Application, & Etc.", Dec. 4, 2005 (printed Feb. 20, 2008 from http://xsp.xegesis.org/).

Codd, E. F., "A Relational Model of Data for Large Shared Data Banks," Communications of the ACM, Jun. 1970, pp. 377-387, vol. 13, No. 6.

Fillat, A.I. et al, "Generalized Organization of Large Data-Bases; A Set-Theoretic Approach to Relations," Project MAC, Mass. Institute of Tech., Jun. 1970, 249 pages (thesis for B.S. and M.S., Dept. Of Electrical Engineering, Mass. Institute of Tech.).

Haghighat, M. et al., "Symbolic Program Analysis and Optimization for Parallelizing Compilers," 1999, pp. 1-30.

Information Access Architectures, PowerPoint presentation 2002 (printed Feb. 20, 2008 from http://xsp.xegesis.org/).

Kanehiro, Kazumi, "Basic Database Course for Programmers—No. 8," Nikkei Software, vol. 9, No. 3, Japan, Nikkei Business Publications, Inc., Jan. 24, 2006, p.p. 134-140 (with English machine-translation).

Kozima, Akira "A Method for Efficient Execution of DOM Programs on XML Views over RDBs," Journal of Information Processing, Japan, Information Processing Society of Japan, Dec. 15, 2005, vol. 46, No. SIG18 (TOD 28), p.p. 72-85 (with English machine-translation).

Rapid Information Access, Jan. 11, 2003 (printed Feb. 20, 2008 from http://xsp.xegesis.org/).

Skolem, T., "Two Remarks on Set Theory," Math. Scand., Apr. 15, 1957, pp. 40-46, vol. 5.

Stein, D., "The Trouble with Software," 2003, pp. 1-10 (printed Feb. 20, 2008 from http://xsp.xegesis.org/).

Stout, R., The Information Access Accelerator, PowerPoint presentation Nov. 4, 2005 (printed Feb. 20, 2008 from http://xsp.xegesis.org/).

X-Set a Closer Look at Digital Archaeology's Patent-Pending Technology, Digital Archaeology, 1998.

X-Set Technology White Paper, Digital Archaeology, Jun. 15, 2000.

* cited by examiner

SYSTEMS AND METHODS FOR INDIRECT ALGEBRAIC PARTITIONING

BACKGROUND OF THE INVENTION

1. Field

The field of the present invention relates to systems and methods for storing and accessing data, and more particularly to data storage, database queries and data retrieval.

2. Background

As the quantity and types of data collected by businesses has increased, the size and complexity of databases used to manage and analyze that data has expanded dramatically. Substantial efforts have been made to improve the access methods and performance of these databases. One technique for improving performance of large databases is to partition tables or other data sets into smaller data sets, sometimes referred to as partitions. Partitioning can be used to improve performance by reducing the amount of data that needs to be retrieved to respond to a query. For example, a query may request data from a data set where specified attributes are within certain ranges. If the data set is partitioned into smaller data sets based on ranges of values for that attribute, only a subset of the partitions may need to be retrieved to respond to the query. While partitioning may be used to improve performance in many database systems, the flexibility and extent to which data partitioning and other optimization may be performed may be limited by the structure imposed on the data when it is received or stored. Many database and data storage systems have predetermined schema that may not capture information regarding the structure of data as it is originally provided. As a result, the extent to which partitioning and other optimization is performed may be limited in many systems.

Some systems capture additional information as data is received that can be used for optimization. For example, U.S. Pat. Nos. 8,032,509, 7,877,370, 7,613,734, 7,769,754, 7,720,806, 7,797,319 and 7,865,503 describe systems and methods in which algebraic relations may be composed from statements received by the system and stored in an algebraic cache for use in responding to subsequent queries. In responding to a query, an optimizer can retrieve and generate alternative collections of algebraic relations equal to the requested data set. The collections of algebraic relations can then be evaluated and the lowest cost collection of algebraic relations can be used to calculate and return the requested data set. The system may also perform comprehensive optimization by analyzing the algebraic cache to generate additional relations and data sets. For example, an optimizer may identify a significant number of restrictions against a specific set using a range of values by inspection of the algebraic cache. From these entries, the optimizer may determine ranges of the values to use for partitioning the data set into subsets. The optimizer may insert the appropriate relations into the algebraic cache for each of the partitioning subsets and also insert a relation indicating that the union of the subsets equals the set. This type of partitioning allows for less data to be examined in responding to queries, resulting in an improvement via the reduction of the calculation time and resources required.

SUMMARY OF THE INVENTION

Example embodiments provide systems and methods for storing and accessing data. Example embodiments may perform optimization based on patterns of requests received by the system and relations between data sets identified by the system. Example embodiments may identify query statements or other statements received by the system to identify patterns that may benefit from optimizations, including direct and indirect partitioning. In some embodiments, patterns may be identified from algebraic relations that are capable of being composed from statements received by the system or by identifying certain types or structures of expressions used in those algebraic relations.

Example embodiments may include a data store for storing data sets, a data set information store for storing information regarding the data sets, an algebraic relation store for storing algebraic relations between data sets, an optimizer for using the algebraic relations to optimize storage and access of data sets from the data store and a set processor for calculating algebraic relations to provide data sets. In example embodiments, modules may be provided by a combination of hardware, firmware and/or software and may use parallel processing and distributed storage in some example embodiments.

Example embodiments may automatically evaluate conditions for direct and indirect partitioning based on statements received by the system or based on algebraic relations composed from statements that have been received by the system and accumulated in a relation store over time.

Example embodiments may identify statements where one or more constituents of a first data set (or an expression applied to one or more constituents of a first data set) are used to restrict a second data set.

Example embodiments may identify a relationship between the first data set and the second data set. Example embodiments may determine whether there is a one-to-one or one-to-many relationship between the members of the first data set and the members of the second data set. In some example embodiments, indirect partitioning of the second data set based on the first data set will only be performed when there is a one-to-one or one-to-many relationship between the members of the first data set and the members of the second data set.

Example embodiments may identify a pattern of requests where constituents of a first data set are used to define components of a second data set. In some example embodiments, the constituents of the first data set may not be included in the second data set. The relation between the constituents in the first data set and the second data set may be indirect. In example embodiments, a pattern of multiple requests may be identified that have the same logical structure with different ranges or constraints on specified constituent(s) of a first data set used to restrict a second data set.

In some example embodiments, indirect partitioning of a data set will only be performed when a pattern of requests is identified where constituent(s) of another data set (or an expression applied to constituent(s) of another data set) are used to restrict the data set. In some example embodiments, a threshold number of requests having the same logical structure must be identified in order for indirect partitioning to be performed.

Example embodiments may determine whether a data set is above a threshold size for partitioning. In some example embodiments, the data set will be partitioned only when the data set is above the threshold size.

Example embodiments may automatically perform direct and/or indirect partitioning when the conditions for direct and/or indirect partitioning are satisfied.

Some example embodiments may automatically perform direct and indirect algebraic partitioning of data sets. In example embodiments, algebraic partitioning may be used to algebraically define components of a data set. In example embodiments, data sets may be indirectly partitioned by defining the components based on one or more constituents of a different data set (or an expression applied to one or more constituents of a different data set). In example embodiments, data set identifiers for the component data sets may be defined and added to a data set information store. In example embodiments, algebraic relations referencing the component data sets may be composed and added to a relation store. Some example embodiments may also physically partition the data sets by realizing the component data sets in a data store.

In example embodiments, indirect partitioning may be performed by joining a first data set and a second data set. One or more constituent(s) of the first data set may then be used to partition the joined data set. In example embodiments, the components of the joined data set include components of the second data set based on the constituent(s) of the first data set. In example embodiments, the components of the joined data set also include the constituent(s) of the first data set that were used for partitioning. In example embodiments, the components of the joined data set can be further partitioned based on the constituent(s) of the first data set. In example embodiments, elements of the first data set that are not used for partitioning may be removed from the joined data set prior to partitioning of the joined data set.

In example embodiments, a data set may be indirectly partitioned based on more than one other data set. In some examples, a first data set may have a one-to-one or one-to-many relationship with a second data set and a second data set may have a one-to-one or one-to-many relationship with a third data set. In some embodiments, indirect partitioning may be performed by joining the first data set, the second data set and the third data set. One or more constituent(s) of the first data set and/or second data set may then be used to partition the joined data set. In example embodiments, elements of the first data set and second data set that are not used for partitioning may be removed from the joined data set prior to partitioning of the joined data set.

In example embodiments, more than one data set may have a one-to-one or one-to-many relationship with a specified data set. In example embodiments, more than one indirect partition may be defined for the specified data set based on constituent(s) of the other data sets. In example embodiments, multiple indirect partitions and multiple sets of components based on those partitions may be defined algebraically and stored in a relation store. In example embodiments, multiple indirect partitions and multiple sets of components based on those partitions may also be calculated and realized in a data store.

In example embodiments, data may be added or deleted by composing algebraic relations between new data sets and existing data sets that have already been directly or indirectly partitioned. In example embodiments, data may be added or deleted without physically inserting or deleting elements in physical components of partitions that have been realized in a data store.

In example embodiments, the algebraic relations composed from direct and indirect partitioning may be accumulated in a relation store over time and may be used to optimize the calculation of requested data sets in the future. Alternative collections of algebraic relations may be generated and evaluated to determine an optimized collection of algebraic relations to use in calculating and providing a requested data set. The optimization may be performed using the algebraic relations rather than retrieving underlying data sets from storage. As a result, optimization may be performed at processor speeds to minimize the amount of time required for data to be retrieved from slower storage. In example embodiments, the collections of algebraic relations may include algebraic relations referencing the data sets and algebraic relations composed from direct and indirect partitioning.

In example embodiments, a restriction statement may be intersected with the components of a partition data set to determine the components to use in calculating a requested data set. In example embodiments, a collection of algebraic relations referencing these components may be composed and evaluated by the optimizer. In example embodiments, the collection of algebraic relations referencing these components may be selected for calculating the requested data set when it provides the lowest cost solution for calculating the requested data set. In example embodiments, when a statement restricts a data set based on constituent(s) of another data set, indirect partitioning may be used to provide collections of algebraic relations for calculating the requested data set based on components of the restricted data set. This may reduce data that needs to be retrieved from the data store and optimize calculation of the requested data set.

In example embodiments, a computer system is provided with one or more processors programmed to perform one or more of the above aspects of the example embodiments. The computer system may include volatile and/or non-volatile storage to provide a data set store, data set information store and relation store. In another aspect, one or more hardware accelerators or other circuitry may be configured to perform one or more of the above aspects of the example embodiments. In another aspect, a computer readable medium is provided with executable instructions for performing one or more of the above aspects of the example embodiments. It is understood that each of the above aspects of the example embodiments may be used alone or in combination with other aspects. A more complete understanding of the above embodiments and other aspects and advantages thereof will be gained from a consideration of the following description read in conjunction with the accompanying drawings provided herein.

INCORPORATION BY REFERENCE

All publications, patents and patent applications mentioned in this specification are herein incorporated by reference to the same extent as if each individual publication, patent or patent application was specifically and individually indicated to be incorporated by reference.

BRIEF DESCRIPTION OF THE DRAWINGS

A better understanding of the features and advantages of the present invention will be obtained by reference to the following detailed description that sets forth illustrative embodiments, in which the principles of the invention are utilized, and the accompanying drawings of which.

DETAILED DESCRIPTION

Figure 1A:
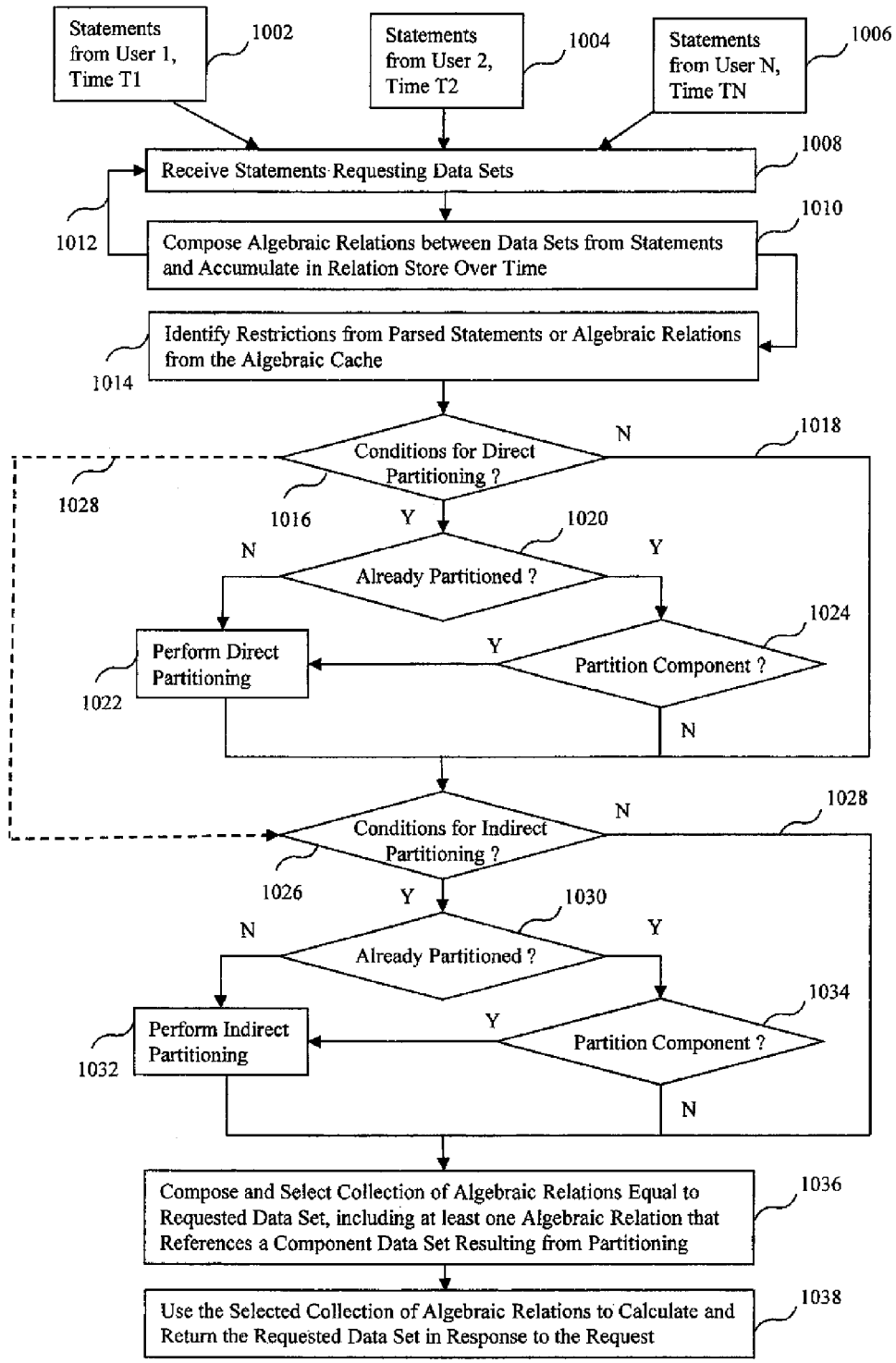
FIG. 1A is a flow chart of a method for direct and indirect partitioning according to an example embodiment.

While the present invention is open to various modifications and alternative constructions, the embodiments shown in the drawings will be described herein in detail. It is to be understood, however, there is no intention to limit the invention to the particular forms disclosed. On the contrary, it is intended that the invention cover all modifications, equivalences and alternative constructions falling within the spirit and scope of the invention as expressed in the appended claims.

Example embodiments provide systems and methods for data storage and processing using extended set processing and algebraic optimization. Example embodiments may be used in combination with systems and methods described in the following patents: U.S. Pat. No. 8,032,509 titled "Systems and Methods for Data Storage and Retrieval Using Algebraic Relations Composed from Query Language Statements"; U.S. Pat. No. 7,877,370 titled "Systems and Methods for Data Storage and Retrieval Using Algebraic Relations Composed from Query Language Statements"; U.S. Pat. No. 7,613,734, titled "Systems and Methods for Providing Data Sets Using a Store of Algebraic Relations"; U.S. Pat. No. 7,769,754, titled "Systems and Methods for Data Storage and Retrieval Using Algebraic Optimization"; U.S. Pat. No. 7,720,806, titled "Systems and Methods for Data Manipulation Using Multiple Storage Formats"; U.S. Pat. No. 7,797,319 titled "Systems and Methods for Data Model Mapping"; and U.S. Pat. No. 7,865,503 titled "Systems and Methods for Data Storage and Retrieval Using Virtual Data Sets"; each of which patents is incorporated herein by reference in its entirety. Example embodiments may be used in combination with all or any part of the systems and methods described in the above referenced patents. For example, computer program modules and computer program instructions to perform one or more of the methods or steps described below may be incorporated into and used as part of the systems and methods described in the above referenced patents.

Example embodiments may perform optimization based on patterns of requests received by the system and relations between data sets identified by the system. Example embodiments may identify query statements or other statements received by the system to identify patterns that may benefit from optimizations. In some embodiments, patterns may be identified from the algebraic relations that are capable of being composed from statements received by the system or by identifying certain types or structures of expressions used in those algebraic relations. In some embodiments, these and other algebraic relations between data sets may be composed and accumulated in memory over time. These algebraic relations may be used to identify patterns and other conditions for optimization.

Example embodiments may automatically detect patterns and conditions for partitioning of data sets, in particular indirect algebraic partitioning. Partitioning refers to defining subsets of a data set, where the union of the subsets is equal to the original data set and the intersection of any two subsets is the empty set. Subsets that meet these conditions are referred to as components of the partition. In example embodiments, new data sets may be defined as a result of partitioning, including a component data set for each component of the partition and a partition data set that is the collection of the component data sets. Algebraic partitioning refers to defining components algebraically, whether or not the components are actually physically stored as components in data storage. For example, algebraic relations may be composed that specify that each component data set is equal to a restriction of the original data set, for example based on distinct ranges of values for a constituent of the original data set. An algebraic relation may also be composed that specifies that the original data set is equal to the union of the components. A partition data set may also be defined and an algebraic relation may be composed that specifies that the partition data set is equal to the collection of the components. These algebraic relations may be used for optimizations, including calculating other data sets algebraically, whether or not the component data sets or partition data set are actually realized in data storage. Physical partitioning refers to partitioning where the components are realized in data storage.

Direct partitioning refers to partitioning of a data set based on one or more constituents of the data set being partitioned or based on an expression applied to one or more constituents of the data set being partitioned. Indirect partitioning refers to partitioning of a data set based on one or more constituents of another data set or based on an expression applied to one or more constituents of another data set. In particular examples, the constituent(s) used for partitioning may not be members of the data set being partitioned. For example, a database may include data sets regarding customers of a store and credit card transactions used to purchase products from the store. A first data set may include data for each customer, including the name of each customer. A second data set may include data for the credit card transactions, including the credit card number, items ordered and amount charged, but may not include the customer name. An example of indirect partitioning may involve defining components of the second data set regarding credit card transactions based on a constituent of the first data set, such as the name of the customer, even though the name of the customer is not included as a constituent of the second data set. In example embodiments, direct and indirect partitioning may be performed as both algebraic partitioning and physical partitioning as further described below.

Since partitioning may be carried out algebraically, multiple different partitions may be defined for the same data set. The partition data sets and component data sets may be defined algebraically and used to perform algebraic optimizations when responding to future requests for data sets. Some or all of the components may also be realized in storage. The algebraic relations stored by the system may be used to determine when the same logical data is available from different physical data sets realized in storage. The physical data sets may contain the same logical data, but may be stored as different physical components or in different physical formats in the storage system. Since algebraic relations are maintained that define the relations between different data sets, the same logical data may be partitioned many different ways both algebraically and physically in storage. In example embodiments, the system is not constrained by a single structure used to store the data in the storage system and can define many different algebraic relations and many different physical data sets that can be used to generate the same logical data. As a result, a large number of options can be evaluated for optimizations and for calculating a requested data set.

In addition, algebraic relations may be used to easily add or delete data, even though a data set may have been partitioned many different times using different definitions for the components. Algebraic relations may be composed and stored in an algebraic cache to indicate the relation between the added or deleted data and the original data set, as well as the relation to the various components of the original data set. In example embodiments, this can be done without requiring the added or deleted data to be inserted or removed from the physical components in storage.

Some example embodiments may automatically carry out direct and indirect algebraic and physical partitioning as statements are received by the system for processing. Some example embodiments may also analyze a cache of algebraic relations that has been accumulated over time to determine whether to perform partitioning, including both direct and indirect algebraic and physical partitioning. For example, partitioning may be performed using spare processor cycles when the system is not being fully utilized. Example embodiments may automatically detect patterns and conditions for partitioning of data sets, in particular indirect algebraic partitioning. For example, embodiments may identify a pattern of requests where constituents of a first data set are used to restrict a second data. In example embodiments, the constituents of the first data set may not be included in the second data set. The constituents of the first data set may then be used to define components of the second data set. In example embodiments, the components may not be capable of being defined directly from the data stored in the second data set. The definition of components of the second data set may depend upon identifying an indirect relationship to constituents of the first data set that is useful for partitioning the second data set. In example embodiments, an indirect relationship may be automatically identified from algebraic relations or expressions stored in a relation store. The relation store may provide an algebraic cache of relations between data sets that have been composed by the system and accumulated over time based on requests received by the system.

One example embodiment includes software modules configured to be executed by a computer to perform the functionality of the system, as described further below in connection with FIGS. 4A and 4B. The software may be component-based and organized into modules that encapsulate specific functionality. The software modules may include computer program instructions to be executed by one or more processors of a computer system to perform the specific functionality of each module according to example embodiments. Example embodiments may include a Data Store 425 for storing data sets, a data set information store (such as Set Universe 450) for storing information regarding the data sets, an algebraic relation store (such as Algebraic Cache 452) for storing algebraic relations between data sets, an Optimizer 418 for evaluating different collections of algebraic relations that can be used to calculate a requested data set and a Set Processor 404 for calculating the requested data set from a selected collection of algebraic relations so it can be provided back to the user that requested it. In example embodiments, modules may be provided by a combination of hardware, firmware and/or software and may use parallel processing and distributed storage in some example embodiments. This is an example only and other software architectures may be used in other embodiments.

In example embodiments, the Optimizer 418 may include a Partitioning Module 430 to automatically perform direct and indirect algebraic partitioning. In some example embodiments, Partition Calculation Module 435 may be included in Set Processor 404 to calculate component data sets and partition data sets based on the algebraic partitioning performed by the Partitioning Module 430. These component data sets and partition data sets may be submitted to Storage Manager 420 for storage in the Data Store 425 to carry out physical partitioning of the data sets as appropriate. However, some example embodiments may not automatically realize all component data sets and partition data sets in storage, but may nonetheless define them algebraically for use by the system in performing algebraic optimizations.

In example embodiments, Partitioning Module 430 may be a computer program module that includes computer program instructions for identifying patterns of requests received by the system (or algebraic relations composed from those requests), where one or more constituents of a first data set (or an expression applied to one or more constituents of the first data set) are used to restrict a second data set. The computer program module 430 may also include computer program instructions to evaluate other conditions for partitioning and, where those conditions are met, automatically compose new data sets and algebraic relations using indirect algebraic partitioning. In particular, the constituent(s) of the first data set (or expressions referencing those constituent(s)) may be used to define components of the second data set and compose algebraic relations referencing those components for use in subsequent optimizations. In example embodiments, Partition Calculation Module 435 in the Set Processor 404 may include computer program instructions for using the new data sets and algebraic relations composed from partitioning to calculate data sets requested by a user. In some embodiments, a separate Partition Calculation Module 435 may not be required and the Set Processor 404 may calculate data sets related to partitioning in the same manner as other data sets. In example embodiments, the Storage Manager 420 may include computer program instructions for realizing some or all of the new data sets resulting from partitioning in the Data Store 425. For example, the Storage Manager 420 may realize data sets in the Data Store 425 that include one or more components of the original data set.

FIG. 1A illustrates a method for automatically directly and indirectly partitioning data sets according to an example embodiment. In the example of FIG. 1A, statements may be submitted to the system by various users over time, as indicated at 1002, 1004 and 1006. The statements may include query statements requesting data sets to be returned by the system or other statements. For example, a first user may submit a query at first time $T_1$ as indicated at 1002, a second user may submit a query at a second time $T_2$ as indicated at 1004 and so on. An Nth user may submit a query at a time $T_N$ as indicated at 1006. In example embodiments, users may be persons or may be other computer systems and processes that submit statements to the system. Users may submit queries and other statements to the system that are independent of one another, although they may reference data sets in the Data Store 425 (or data sets that may be calculated from data sets in the Data Store 425) that have various inter-relationships. The statements may be submitted in parallel or spaced apart by minutes, hours, days, weeks, months or other periods of time. Each user may submit many statements over time and there may be many different users over time. For example, there may be two, ten, one hundred, one thousand, ten thousand, one hundred thousand, one million or more users over time. Any number of statements may have been submitted to the system over time ranging, for example, up to one thousand, ten thousand, one hundred thousand, one million, ten million, one hundred million or more.

The statements submitted to the system may be received by the system as indicated at 1008. As shown in FIG. 4A, the statements may be received in various formats by connectors. In one example embodiment, three interfaces are provided: an SQL connector 406 for submitting standard SQL92-compliant statements, an XSN connector 410 for submitting statements using an extended set notation (XSN) based on extended set algebra, and an XML connector 412 for submitting Web Services W3C XQuery-compliant and other XML-based statements. These are examples only and statements may be submitted in other formats in other embodiments. Statements received in different formats may be translated into a common format, such as XSN, for processing by an interface module, such as XSN Interface 416. For example, SQL translator 408 may translate SQL statements into an XSN format and XML translator 414 may translate XML statements into an XSN format. The XSN Interface 416 may, in turn, convert the XSN statements into an internal representation based on extended set algebra for processing by the system.

The system may respond to the statements by providing data sets or taking other actions in response to the statements, as described further below. However, the statements may also be treated as a source of information that can be captured by the system and used for optimizations. The optimizations may then be used to respond to the current statement or to respond to subsequent statements submitted to the system in the future. Future statements may be submitted independently from the statements that were used to generate the optimizations and may be from different users over different periods of time (for example, spaced apart by minutes, hours, days, weeks, months or other periods of time).

In example embodiments, information is captured from statements submitted to the system by defining data sets and composing algebraic relations between the data sets based on the statements as indicated at step 1010 in FIG. 1A. For example, a query language statement may be presented to the system. In some examples, the query language statement may be in a structured query language (SQL) format using a relational data model or an extended set notation using a model based on extended set algebra or other format. A plurality of algebraic relations may then be composed from the statements and stored in an algebraic relation store, such as Algebraic Cache 452. This process may be repeated as indicated at 1012. In example embodiments, a large number of algebraic relations between data sets may be accumulated in the relation store over time as statements are presented to the system.

In an example embodiment, XSN statements received by XSN Interface 416 are parsed and converted into an internal tree representation when they are received. As the XSN statements are parsed, the XSN Interface 416 may call the Set Manager 402 to assign global unique identifiers (GUIDs) to the data sets referenced in the statements. The overall algebraic relation representing the XSN statement may also be parsed into components that are themselves algebraic relations. In an example embodiment, these components may be algebraic relations with an expression composed of a single operation that references from one to three data sets. Each algebraic relation may be stored in the Algebraic Cache 452 in the Set Manager 402. A GUID may be added to the Set Universe 450 for each new algebraic expression, representing a data set defined by the algebraic expression. The XSN Interface 416 and Set Manager 402 thereby compose a plurality of algebraic relations referencing the data sets specified in statements presented to the system as well as new data sets that may be created as the statements are parsed. In this manner, the XSN Interface 416 and Set Manager 402 capture information from the statements presented to the system. These data sets and algebraic relations can then be used for algebraic optimization when data sets need to be calculated by the system.

For example, the system may receive a query language statement specifying a data set that is the intersection of a first data set A and a second data set B. The resulting data set C may be determined and may be returned by the system. In this example, the modules processing this request may call the Set Manager 402 to obtain known relationships from the Algebraic Cache for data sets A and B that may be useful in evaluating the intersection of data sets A and B. It may be possible to use known relationships to determine the result without actually retrieving the underlying data for data sets A and B from the storage system. The Set Manager 402 may also create a new GUID for data set C and store its relationship in the Algebraic Cache (i.e., data set C is equal to the intersection of data sets A and B). Once this relationship is added to the Algebraic Cache, it is available for use in future optimizations and calculations. All data sets and algebraic relations may be maintained in the Set Manager 402 to provide temporal invariance. In some example embodiments, the existing data sets and algebraic relations are not deleted or altered as new statements are received by the system. Instead, new data sets and algebraic relations are composed and added to the Set Manager 402 as new statements are received. For example, if data is requested to be removed from a data set, a new GUID can be added to the Set Universe 450 and defined in the Algebraic Cache 452 as the difference of the original data set and the data to be removed.

In example embodiments, new data sets may also be defined and new algebraic relations may be composed by Optimizer 418 during the course of performing optimizations for responding to the statements received by the system. For example, the Optimizer 418 may generate and evaluate alternative collections of algebraic relations to determine an optimized collection of algebraic relations to use in calculating and providing a requested data set. The optimizations may be performed using the algebraic relations rather than retrieving underlying data sets from storage. As a result, optimizations may be performed at processor speeds with access to slower storage minimized. In an example embodiment, the Optimizer 418 receives algebraic expressions from the XSN Interface 416 and optimizes them for calculation. When a data set needs to be calculated (e.g., for purposes of realizing it in the storage system or returning it in response to a request from a user), the Optimizer 418 retrieves an algebraic relation from the Algebraic Cache 452 that defines the data set. The Optimizer 418 can then generate a plurality of collections of other algebraic relations that define an equivalent data set. Algebraic substitutions may be made using other algebraic relations from the Algebraic Cache and algebraic operations may be used to generate relations that are algebraically equivalent. In one example embodiment, all possible collections of algebraic relations are generated from the information in the Algebraic Cache that define a data set equal to the specified data set.

The optimization process may result in additional data sets and algebraic relations being defined and composed. These data sets and algebraic relations may, in turn, be submitted to the Set Manager 402 to be added to the Set Universe 450 and Algebraic Cache 452 and may be used in the future for optimizations, including indirect algebraic partitioning as described further below. For example, new algebraic relations may be composed by substituting expressions that are algebraically equivalent. A simple example is a restriction on two joined sets. Using some notational shorthand, this could be expressed as SET A=R(J(a,b,c),d), where R indicates a restriction operation and J indicates a join operation and a, b, c and d are data sets. However, the join operation is also capable of doing restrictions and an equivalent expression is SET A=J(a,b,CP(c,d)), where CP indicates a cross product operation. In example embodiments, this alternative algebraic relation for SET A may be composed by the Optimizer 418 and added to the Algebraic Cache 452. Algebraic relations may also be composed based on information that has been accumulated by the system regarding underlying data sets. For example, the Data Store 425 may include data sets about commercial transactions, including orders that have been placed by customers (including, for example, the order date) and the line items that have been included in the order (including the item ordered and the price). If a new product was first released on a particular date, the data sets may only include orders for that product having an order date on or after that particular date. The Algebraic Cache 452 may already include an algebraic relation indicating that there are no orders for that product prior to the particular date. This algebraic relation could then be used to modify a general query for all orders that include the particular product. An alternative algebraic relation for the requested data set may be composed that includes an expression restricting the orders to those on or after the particular date when the new product was first released.

In example embodiments, Optimizer 418 includes Partitioning Module 430 which may also define new data sets and compose new algebraic relations based on direct and indirect algebraic partitioning. For example, new data sets may be defined for each of the components of the partitioned data set. Example methods for defining and composing new data sets and algebraic relations based on direct and indirect algebraic partitioning are described further below. In example embodiments, this is an ongoing process. When these methods are performed for a particular data set, they may have already been applied to any number of data sets in the past. Data sets and algebraic relations based on direct and indirect algebraic partitioning may already have been accumulated in the relation store over time for many different partitions of the same or different data sets. For example, the same or different data sets may have been subject to various direct and indirect algebraic partitioning over time resulting in additional data sets and algebraic relations referencing components of those data set being stored in the Algebraic Cache 452. These additional data sets and algebraic relations may be used by the Optimizer 417 (in combination with other available data sets and algebraic relations) to generate various alternative collections of algebraic relations that can be used to calculate a requested data set.

The Optimizer 418 may then determine an estimated cost for calculating the requested data set from each of the collections of algebraic relations. The cost may be determined by applying a costing function to each collection of algebraic relations, and the lowest cost collection of algebraic relations may be used to calculate the specified data set. In one example embodiment, the costing function determines an estimate of the time required to retrieve the data sets from storage that are required to calculate each collection of algebraic relations and to store the results to storage. If the same data set is referenced more than once in a collection of algebraic relations, the cost for retrieving the data set may be allocated only once since it will be available in memory after it is retrieved the first time. In this example, the collection of algebraic relations requiring the lowest data transfer time is selected for calculating the requested data set. The collection of algebraic relations used to calculate the requested data set may include algebraic relations composed from the statement that requested the data set as well as algebraic relations for data sets that are not composed from the query language statement. For example, algebraic relations that have previously been composed from other statements independently submitted to the system (for example, for requests for different data sets or from different users or at different times) may be included in or used to generate the collection of algebraic relations for calculating the requested data set.

In example embodiments, the above process of receiving and responding to statements received by the system, and defining and composing new data sets and algebraic relations, may be repeated on an ongoing basis as indicated at 1012 in FIG. 1A. This results in an ever-expanding universe of data sets and algebraic relations that may be accumulated over time in the Set Universe 450 and Algebraic Cache 452. In example embodiments, the number of data sets and algebraic relations may exceed one thousand, one hundred thousand, one million, ten million, one hundred million or more. They may be accumulated from statements and optimizations performed over different periods of time for different users and for requests for different data sets independent from one another. However, they may be made available for optimizations for responding to future requests that are independently submitted to the system, even though the user submitting those requests may have no knowledge of or access to the prior requests. The Set Universe 450 and Algebraic Cache 452 may be loaded into a memory that can be accessed by a processor at higher speeds than underlying storage used to store the physical data sets. As a result, optimizations may be evaluated at processor speeds to determine the best way to calculate a requested data set prior to accessing the underlying data sets from storage.

In example embodiments, the system may identify particular patterns in the statements received by the system in order to perform additional optimizations, including direct and indirect algebraic partitioning. For example, Partitioning Module 430 may be included in the Optimizer 418. This is an example only and Partitioning Module 430 may be located in other locations in other embodiments. For example, some of the functions of the Partitioning Module 430 may be performed by the XSN Interface 416, such as detection of certain patterns in statements when they are received and parsed into algebraic relations by the XSN Interface 416. In other examples, Partitioning Module 430 may be included as a separate module with access to the Set Manager 402, Set Universe 450 and/or Algebraic Cache 452 to analyze data sets and algebraic relations that have already been stored to identify patterns for performing additional optimizations.

In one example embodiment, statements received by the system are converted into an internal representation by XSN Interface 416 based on extended set algebra and parsed into a collection of algebraic relations that define a data set equal to the requested data set. For example, the internal structure may be a tree structure, such as an XSN tree as described in the patents referenced at the beginning of this description which are incorporated herein by reference. The XSN tree may be passed to the Optimizer 418 to be optimized for calculating the requested data set to be returned to the user. As part of the optimization, the Partitioning Module 430 may determine whether the statement received by the system triggers the conditions for direct or indirect partitioning. While this example analyzes statements as they are received to determine whether to perform partitioning, other embodiments may retrieve algebraic relations from the Algebraic Cache 452 that have been accumulated over time and analyze those algebraic relations in a similar manner to determine whether to perform partitioning. For example, this may be done in the background using available processor cycles as part of comprehensive optimization.

In one example embodiment, the Partitioning Module 430 identifies algebraic relations in the XSN tree that include restrictions against a data set to determine whether to perform partitioning, as indicated at 1014 in FIG. 1A. In this example, if a restriction against a data set is identified based on one or more constituents of that data set (or based on an expression applied to on one or more constituents of that data set), the Partitioning Module 430 may evaluate the conditions for direct partitioning of the data set as indicated at 1016 in FIG. 1A. For example, a query may reference an Orders data set regarding orders that have been placed by customers, which includes the order date, O_OrderDate, as a constituent of each member of the data set representing an order. The query may request information only from orders for a particular range of order dates. The parsed statement would include an algebraic relation with a restriction against the data set based on a range of values for the order date. For example, the XSN tree may include an algebraic expression restricting the data set to orders where the order date is within the month of January, 1996, such as Rest (Orders, O_OrderDate>=Jan. 1, 1996 and <Feb. 1, 1996). This is a simplified notation for illustrative purposes. A different internal representation may be used by the system in example embodiments.

If a restriction is identified, the Partitioning Module 430 may identify whether there is a pattern of restrictions against the data set using different values or ranges for the same constituent(s). In one example, the Partitioning Module 430 may request the Set Manager 402 to return a list of all algebraic relations stored in the Algebraic Cache 452 that are restrictions against the Orders data set based on the order date, O_OrderDate. If the number of restrictions in the list is below a threshold, the Partitioning Module 430 may determine that there is no pattern and will not directly partition the Orders data set as indicated at 1018. In one example, if the list is empty or has one member, there is no pattern. If there have been two or more requests, the Partitioning Module 430 recognizes a pattern and may consider partitioning of the Orders data set. Other thresholds may be used in other embodiments. For example, other embodiments may use a threshold between two and one hundred (or any range subsumed therein) or more or may use different thresholds over different periods of time. For example, the threshold may require more than a certain number of occurrences in the last hour, day, week and/or other period of time. The threshold number may be two, four, ten or some other number and the threshold number may vary depending upon the period of time (for example, two occurrences within the last 24 hours or four occurrences within the last week or more than ten occurrences over any period of time).

If the Partitioning Module 430 detects a pattern, it may then determine whether the data set has already been partitioned based on the same constituent(s) as indicated at 1020. In an example embodiment, this can be determined from the Algebraic Cache 452. If the Algebraic Cache 452 already contains an algebraic relation indicating that the data set is equal to a partition based on ranges applied to the same constituent(s), then the Partitioning Module 430 treats the data set as already having been partitioned. For example, using a simplified notation, the following relation may be included in the Algebraic Cache 452 indicating that the Orders data set has already been partitioned: Orders=partition $(R_1, R_2, \ldots R_N)$, where $R_N$ indicates distinct ranges of values for O_OrderDate.

If the Partitioning Module 430 detects a pattern, the data set has not already been partitioned and the data set is above a minimum size, the Partitioning Module 430 may perform direct algebraic partitioning of the data set as indicated at 1022. In one example, the minimum size is 100 megabytes (MB) and the data set is not partitioned if it is below the minimum size. In example embodiments, the size of each data set may be stored in the Set Universe 450. If the data set is above the minimum size, Partitioning Module 430 may then perform direct algebraic partitioning as indicated at 1022 by defining components of the data set based on ranges of values for the specified constituent(s). In an example embodiment, the Partitioning Module 430 may determine the minimum and maximum values for the constituent(s) in the data set and then define ten segments of equal range between the minimum and maximum values. This defines criteria for ten components of equal range based on the specified constituent(s).

In example embodiments, this approach may be applied recursively to obtain finer grained components. If a data set has already been partitioned, the Partitioning Module 430 may determine whether a component of the existing partition should be further partitioned as indicated at 1024. For example, if a pattern of requests is detected for ranges that intersect the component, the component may be further partitioned into ten sub-components, each with equal range. This process can be continued until the minimum size threshold is met. For example, in one embodiment, components may continue to be partitioned until the component is less than 100 MB in size.

The above are examples only and other criteria may be used for defining components in other embodiments. For example, Partitioning Module 430 may consider the data frequency or distribution within the data set when deciding how to partition. In one example, the Partitioning Module 430 may define components of the data set having equal cardinality. In another example, the constituent may have a limited number of distinct values and the number of components may be limited by the number of distinct values. For example, where the constituent has a binary value (for example, male or female), the Partitioning Module 430 may partition the data set into only two components (and further partitioning of those components would not be performed based only on the binary constituent). However, this constituent could still be combined with other constituents for other partitioning (such as components based on age ranges for males and females). In another example, a constituent may have values corresponding to one of twenty six different countries or geographic regions covered by the data set. This constituent could be used to partition the data set into twenty six different components. In some examples, the criteria for defining components may also depend on the pattern of requests that has been detected by the Partitioning Module 430. For example, if there is a pattern of requests using a particular size or type of range for restricting the data set, that size or type of range may be used to define the components. For example, if there is a pattern of restrictions against the Orders data set where the O_OrderDate is restricted by month, the Orders data set may be partitioned into components based on the month of the order date. In some example embodiments, the criteria used to define components may be dynamically tuned to use different criteria as the data set is further partitioned. For example, the Orders data set may initially be partitioned based on month. If a pattern of restrictions within a month is detected, these components may be further restricted using different criteria (such as ten segments of equal range or based on the day of the month or other criteria).

In example embodiments, new data sets may be defined as a result of partitioning and stored in the Set Universe 450 and new algebraic relations may be composed and stored in the Algebraic Cache 452. For example, a component data set for each component of the partition and a partition data set that is the collection of the component data sets may be defined and stored in the Set Universe 450. For example, a data set for each component of an Orders data set ($OC_1, OC_2, \ldots OC_N$) that has been partitioned by ranges of O_OrderDate ($R_1, R_2, \ldots R_N$) may be added to the Set Universe 450. For example, the data set identifiers indicated at 460 in FIG. 4B may represent component data sets added to the Set Universe 450 based on partitioning. Algebraic relations may also be added to the Algebraic Cache 452 indicating that the data set has been partitioned, such as Orders=partition($R_1, R_2, \ldots R_N$), where $R_N$ indicates distinct ranges of values for O_OrderDate. An algebraic relation may also be composed that specifies that the original data set is equal to the union of the components, such as Orders=union($OC_1, OC_2, OC_N$). For example, the algebraic relations indicated at 470 in FIG. 4B may represent algebraic relations added to the Algebraic Cache 452 that reference the component data sets. A partition data set may also be defined and an algebraic relation may be composed that specifies that the partition data set ($P_1(O)$) is equal to the collection of the components, such as $P_1(O)=\{OC_1, OC_2, \ldots OC_N\}$. For example, the data set identifier indicated at 465 in FIG. 4B may represent the partition data set added to the Set Universe 450 and the algebraic relation indicated at 475 in FIG. 4B may represent the algebraic relation added to the Algebraic Cache 452 that references the partition data set. The above examples use a simplified notation for illustrative purposes. A different internal representation may be used by the system in example embodiments. These new data sets and algebraic relations may then be used for optimizations in algebraic space (for example, by the Optimizer in determining collections of algebraic relations that can be used to calculate a requested data set), whether or not each of the components or other data sets has been realized in data storage.

In example embodiments, Partitioning Module 430 may also evaluate conditions for indirect partitioning of data sets. In some example embodiments, this may be performed after the conditions for direct partitioning have been evaluated as indicated at 1026. In other embodiments, the direct and indirect partitioning may be performed in parallel as indicated by the dashed line 1028 in FIG. 1A. In example embodiments, direct partitioning is not required for indirect partitioning and indirect partitioning may be performed whether or not the primary data set has been partitioned. For example, in some embodiments, the primary data set will not be partitioned because it is below a minimum size for partitioning, such as 100 MB.

Figure 2A:
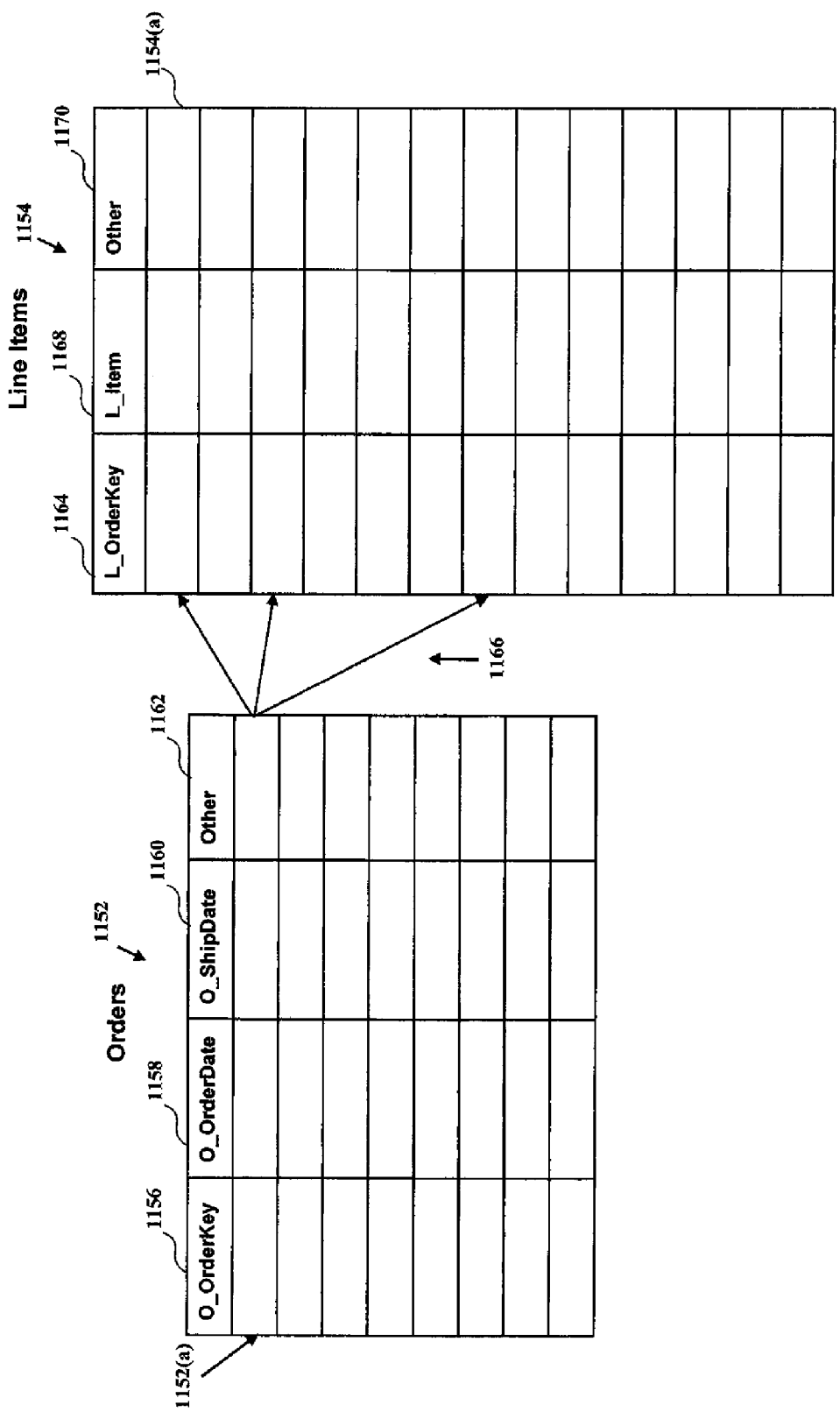
FIG. 2A shows two example data sets, Orders and Line Items, used to illustrate indirect partitioning according to an example embodiment.

FIG. 2A illustrates data sets that will be used as examples in discussing the methods for indirect partitioning below. FIG. 2A illustrates two data sets, an Orders data set 1152 and a Line Items data set 1154. The Orders data set 1152 includes a data set for each order as indicated at 1152a (illustrated as a row in FIG. 2A). In this example, each order has a primary key (O_OrderKey) that is unique for each order in the data set, as indicated at 1156 (illustrated as a column in FIG. 2A). Each order also includes the order date (O_OrderDate) for the order as indicated at 1158 (illustrated as a column in FIG. 2A), ship date (O_ShipDate) for the order as indicated at 1160 (illustrated as a column in FIG. 2A) and other attributes of each order (illustrated as other columns 1162 in FIG. 2A). The Line Items data set 1154 includes one or more line items that are included in each order, as indicated at 1154a (illustrated as a row in FIG. 2A). Each line item has a foreign key (L_OrderKey) 1164 indicating the order with which the line item is associated (illustrated as a column in FIG. 2A). In this example, there is a one-to-one or one-to-many relationship between orders and line items and the order key is unique for each order. Each line item also includes the name of the item (L_Item) as indicated at 1168 (illustrated as a column in FIG. 2A) and other attributes of each line item (illustrated as other columns 1170 in FIG. 2A).

While the example of FIG. 2A is illustrated using tables based on a relation model, example embodiments are not limited to the relational model. For example, data sets may be provided as extended sets, markup language, triples or in other formats. In example embodiments, internal representations of the data sets are composed based on extended set algebra. In one example, extended sets are represented as a collection of couplets. Each couplet includes a constituent and a scope. In the example above, an extended set representation of the Orders data set may include an extended set for each order, with a couplet corresponding to each attribute of the order. For example, the order date for each order would be represented with a couplet having a constituent that is the date of the order and a scope indicating that it is the O_OrderDate. An example for a order placed on an order date of Jan. 15, 1996 is: {Jan. 15, 1996, O_OrderDate}. Each order would be an extended set represented as a collection of couplets having scope $S_N$ and constituent $C_N$, such as: $\{S_1.C_1, S_2.C_2, \ldots S_N.C_N\}$. When representing a relational table, as in this example, each scope is constrained to be unique and corresponds to a single column of the table. This is referred to as being "scope functional," meaning that all scopes within the extended set are unique. The table is represented as a collection of extended sets, referred to as a clan. A clan is a higher order mathematical object than an extended set and has different algebraic operations that operate on it than extended sets (for example, algebraic operations that operate on collections of extended sets). Each of the tables in FIG. 2A, Orders and Line Items, may be represented by a clan in example embodiments. Data set identifiers and algebraic relations referencing these clans may be stored in the Set Universe 450 and Algebraic Cache 452. In addition, in some example embodiments, components of a clan that result from partitioning may also be represented as clans (with each component being a collection of the extended sets that falls within the criteria defining that component). Other classes of mathematical objects may also be used in example embodiments. For example, some data sets may be defined as collections of clans, which are referred to as hoards in example embodiments. A hoard is a higher order mathematical object than a clan and has different algebraic operations that operate on it than clans (for example, algebraic operations that operate on collections of clans). In some example embodiments, a partition data set that results from partitioning a clan may be represented as a hoard. For example, the partition data set may be defined as a collection of components, where each component is a clan.

In example embodiments, the system is not constrained by the relational structure illustrated in FIG. 2A and the data may be requested and stored in different formats, with algebraic relations used to determine the relationships between them. In addition, example embodiments of the system are not required to enforce the primary key/foreign key relationships used in the relational model (for example, the use of O_Order-Key as the primary key for the Orders table and L_OrderKey as the foreign key in the Line Items table). Instead, when keys are used in statements submitted to the system, algebraic relations may be added to the Algebraic Cache 452 indicating the relationship established by the keys. In example embodiments, any scope that has distinct constituents within a data set may be used as a key for that data set. In addition, combinations of different scopes may be used as a key. For example, a data set without a specific key may use the concatenation of constituents from one or more scopes to uniquely identify members of the data set. In example embodiments, the system is not constrained to using L_OrderKey as a foreign key to determine which order corresponds to a line item. Any scope (or combination of scopes) from the Line Items data set can be used that specifies which orders correspond to a line item.

An example method for automatic indirect algebraic partitioning will now be described with reference to the above examples for illustrative purposes. As indicated at 1026 in FIG. 1A, if a restriction has been identified at step 1014, the Partitioning Module 430 may evaluate the conditions for indirect partitioning. As described above, this may be done after or in parallel with direct partitioning of the primary data set or may be performed without partitioning the primary data set. The steps used to perform indirect partitioning in an example embodiment are shown in general in FIG. 1A and in additional detail in FIG. 1B. In evaluating the conditions for indirect partitioning in this example, the Partitioning Module 430 will first determine whether a first data set is being used to restrict a second data set as indicated at 1100 in FIG. 1B. For example, the system may receive a statement requesting selected members of the Line Items data set based on order date. Table 1 below shows an example statement that may be submitted to the system to select line items for orders during the month of January 1996 (based on a simplified representation of an SQL select statement).

TABLE 1

| |
|---|
| Select: L_Item |
| From: Orders, Line Items |
| Where: O_OrderDate >= January 1, 1996 and < February 1, 1996 and O_OrderKey = L_OrderKey |

As described above, this statement would be parsed by XSN Interface and the Partitioning Module 430 would identify algebraic relations in the XSN tree that include restrictions. For example, the above statement would be parsed into a collection of algebraic relations that includes a restriction based on the O_OrderDate. In evaluating the conditions for indirect partitioning, the Partitioning Module 430 would determine whether constituents of a first data set are being used to restrict a second data set as indicated at 1100 in FIG. 1B. For example, the Partitioning Module 430 would identify algebraic relations indicating a restriction on O_OrderDate and a specified relationship between Orders and Line Items (in this example, O_OrderKey=L_OrderKey). While O_OrderDate is not included in Line Items, a relationship between Orders and Line Items is specified that can be used to determine how to restrict Line Items based on the order date. In other examples, the restriction against the second data set may be based on more than one constituent of the first data set or may be based on an expression applied to one or more constituent(s) of the first data. These are examples only and Partitioning Module 430 may identify other statements or algebraic relations indicating that data from a second data set is being be defined in terms of one or more constituents of a first data set.

Figure 1B:
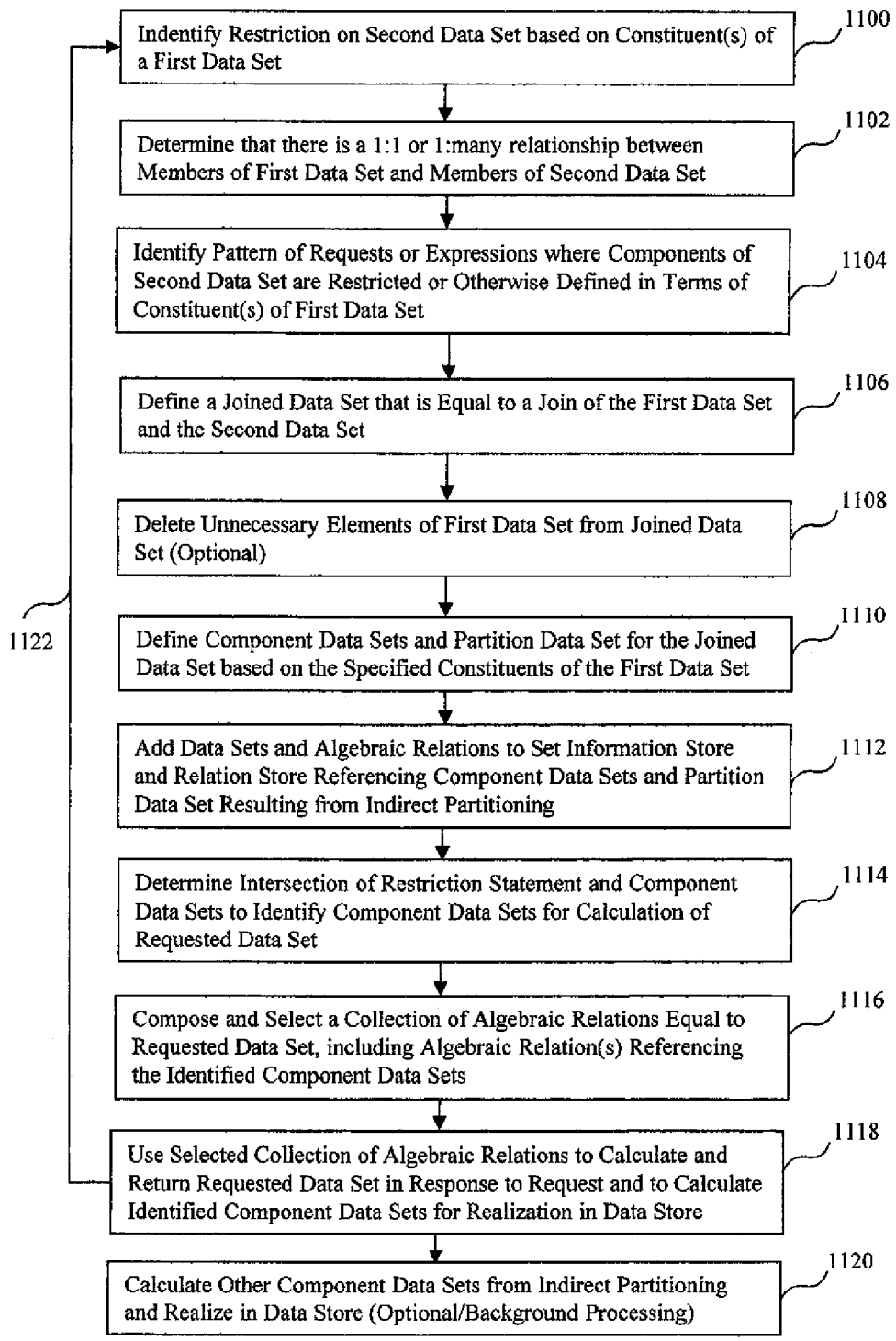
FIG. 1B is a flow chart of a method for indirect partitioning according to an example embodiment.

In this example, if a restriction against a data set is identified based on one or more constituents of a different data set (or based on an expression applied to on one or more constituents of a different data set), the Partitioning Module 430 may evaluate other conditions for indirect partitioning as indicated at 1102 and 1104 in FIG. 1B. In example embodiments, the Partitioning Module 430 will consider whether there is a relationship between the first data set and the second data set, whether the relationship is a one-to-one or one-to-many relationship and whether the first data set is useful for partitioning the second data set. For example, in the statement described above, a relationship between Orders and Line Items is expressly stated in the statement (in this example, O_OrderKey=L_OrderKey). In some examples, a relationship may not be expressly stated, but may be specified by one or more algebraic relations in the Algebraic Cache 452.

In example embodiments, the Partitioning Module 430 will then consider whether the relationship is a one-to-one or one-to-many relationship as indicated at 1102 in FIG. 1B. In this example, indirect partitioning will only be performed based on the relationship if it is a one-to-one or one-to-many relationship. For example, indirect partitioning of the Line Items data set based on constituents of the Orders data set would only be performed if each line item corresponds to a distinct order. While there may be one or more line items for each order, indirect partitioning would not be performed if there is more than one order corresponding to a line item. In this example, the Partitioning Module 430 would examine the identified relationship between Orders and Line Items, O_OrderKey=L_OrderKey. Since the correspondence is based on O_OrderKey, the Partitioning Module 430 would determine whether the O_OrderKey is unique and distinct for each member of the Orders data set. A constituent (or expression applied to one or more constituents) that meets these criteria will be referred to as a key for the data set. In some cases, this may be determined based on algebraic relations that are already stored in the Algebraic Cache 452 indicating that O_OrderKey qualifies as a key for the Orders data set. For example, the Algebraic Cache 452 may include a cardinality expression indicating that a particular scope, "s", is distinct and unique. For example, Algebraic Cache 452 may include an expression indicating that cardinality(a)=cardinality(a° {{s$^s$}}), where "a" is a data set, "s" is the scope being examined, and ° is the cross composition operator which produces a set of extended sets of only the couplets in "a" whose scope is "s". In other cases, the Partitioning Module 430 will determine whether the constituent (or expression applied to one or more constituents) is unique. For example, the Partitioning Module 430 may scan each member of the data set to determine whether the constituent of each member is unique. In one example, the Partitioning Module 430 determines the number of members in the data set and the number of unique values for the constituent. If they are equal, the values are considered unique and the constituent qualifies as a key. In the example shown in FIG. 2A, the O_OrderKey is unique and distinct for each member of the Orders data set, so the Partitioning Module 430 would determine that the relationship between Orders and Line Items, O_OrderKey=L_OrderKey, specifies a one-to-one or one-to-many relationship.

If the relationship between the first data set and the second data set is a one-to-one or one-to-many relationship, Partitioning Module 430 will then determine whether a pattern of restrictions exist where the constituent(s) of the first data set (or expression applied to one or more constituents of the first data set) are used to restrict the second data set as shown at 1104 in FIG. 1B. For example, Partitioning Module 430 may identify expressions having the same logical structure with different values for one or more of the constituents referenced in those expressions to restrict the second data set. In one example, the Partitioning Module 430 may request the Set Manager 402 to return a list of all algebraic relations stored in the Algebraic Cache 452 that are restrictions against the second data set (for example, Line Items) based on the constituent(s) of the first data set (for example, Orders). In some examples, the Partitioning Module 430 may also determine whether the first data set (for example, Orders) has already been directly partitioned based on the constituent(s) and whether the components of that partition have been used to restrict the second data set. By analyzing existing algebraic relations restricting the second data set, the Partitioning Module 430 may determine how many times the second data set has been restricted based on the particular constituent(s) of the first data set (or by an expression applied to one or more constituents of the first data set), for example where the same logical structure is used to restrict the second data set based on different values for the constituent of the first data set. If the number of these restrictions identified by the Partitioning Module 430 is below a threshold, the Partitioning Module 430 may determine that there is no pattern and will not indirectly partition the second data set as indicated at 1028. In one example, if the list of restrictions identified by the Partitioning Module 430 is null or has one member, there is no pattern. If there are two or more restrictions meeting these conditions, the Partitioning Module 430 recognizes a pattern as indicated at 1104 in FIG. 1B and may consider indirect partitioning of the second data set. Other thresholds may be used in other embodiments. For example, other embodiments may use a threshold between two and one hundred (or any range subsumed therein) or more or may use different thresholds over different periods of time. For example, the threshold may require more than a certain number of occurrences in the last hour, day, week and/or other period of time. The threshold number may be two, four, ten or some other number and the threshold number may vary depending upon the period of time (for example, two occurrences within the last 24 hours or four occurrences within the last week or more than ten occurrences over any period of time).

If the Partitioning Module 430 detects a pattern, it may then determine whether the data set has already been indirectly partitioned based on the same constituent(s) of the first data set as indicated at 1030 in FIG. 1A. In an example embodiment, this can be determined from the Algebraic Cache 452. The algebraic relations added to the Algebraic Cache 452 when indirect partitioning is performed are described further below. If these algebraic relations already exist in the Algebraic Cache 452 based on the same constituent(s), then the Partitioning Module 430 treats the data set as already having been indirectly partitioned.

If the Partitioning Module 430 detects a pattern, the data set has not already been indirectly partitioned and the data set is above a minimum size, the Partitioning Module 430 may perform indirect algebraic partitioning of the data set as indicated at 1032 in FIG. 1A. In one example, the minimum size is 100 megabytes (MB) and the data set is not partitioned if it is below the minimum size. In example embodiments, the size of each data set may be stored in the Set Universe 450. If the data set is above the minimum size threshold, the Partitioning Module 430 may then perform indirect algebraic partitioning as indicated at 1032 in FIG. 1A by defining components of the data set based on ranges of values for the specified constituent(s). In an example embodiment, the Partitioning Module 430 may determine the minimum and maximum values for the constituent in the first data set and then define ten pieces of equal range between the minimum and maximum values. This defines criteria for ten components of equal range based on the specified constituent(s).

In example embodiments, this approach may be applied recursively to obtain finer grained components. If a data set has already been partitioned, the Partitioning Module 430 may determine whether a component of the existing partition should be further partitioned as indicated at 1034 in FIG. 1A. For example, if a pattern of requests is detected for ranges that intersect the component, the component may be further partitioned into ten sub-components, each with equal range. This process can be continued until the minimum size threshold is met. For example, in one embodiment, components may continue to be partitioned until the component is less than 100 MB in size.

The above are examples only and other criteria may be used for defining components in other embodiments. For example, in some embodiments, if the first data set has already been directly partitioned based on the constituent(s) (or is in the process of being directly partitioned, for example using parallel processing), the same component definitions may be used (for example, the same ranges of values for the constituent(s)) to indirectly partition the second data set. In other examples, Partitioning Module 430 may consider the data frequency or distribution within the first data set and/or the second data set when deciding how to partition the second data set. In one example, the Partitioning Module 430 may define components of the second data set having equal cardinality. Alternatively, the Partitioning Module 430 may define components using criteria that, when applied to the first data set, would result in components of the first data set having equal cardinality. In some embodiments, Partitioning Module 430 could consider both the cardinality of components of the first data set and components of the second data set that would result in determining what criteria to use. In another example, the constituent may have a limited number of distinct values and the number of components may be limited by the number of distinct values. For example, where the constituent has a binary value (for example, male or female), the Partitioning Module 430 may partition the second data set into only two components (and further partitioning of those components would not be performed based only on the binary constituent). However, this constituent could still be combined with other constituents for other partitioning (such as components based on age ranges for males and females). In another example, a constituent may have values corresponding to one of twenty six different countries or geographic regions covered by the data set. This constituent could be used to partition the second data set into twenty six different components. In some examples, the criteria for defining components may also depend on the pattern of requests that has been detected by the Partitioning Module 430. For example, if there is a pattern of requests using a particular size or type of range for restricting the second data set, that size or type of range may be used to define the components. For example, if there is a pattern of restrictions against the Line Items data set where the order date is restricted by month, the Line Items data set may be partitioned into components based on the month. In some example embodiments, the criteria used to define components may be dynamically tuned to use different criteria as the data set if further partitioned. For example, Line Items may initially be partitioned based on the month of the order date. If a pattern of restrictions within a month is detected, these components may be further restricted using different criteria (such as ten components or equal range or based on the day of the month or other criteria).

In order to partition the second data set (such as Line Items), Partitioning Module 430 cannot operate only on the second data set if the second data set does not contain the constituent(s) used for partitioning. For example, the Line Items data set does not contain O_OrderDate and cannot be directly partitioned based on O_OrderDate. In one example, Partitioning Module 430 will scan each member of Line Items, evaluate the corresponding order and O_OrderDate, and determine what component it belongs to. In example embodiments, new data sets may be defined as a result of partitioning and stored in the Set Universe 450 and new algebraic may be composed and stored in the Algebraic Cache 452. For example, a component data set for each component of the partition and a partition data set that is the collection of the component data sets may be defined and stored in the Set Universe 450. For example, a data set for each component of the Line Items data set ($LC_1, LC_2, \ldots LC_N$) that has been partitioned by ranges of O_OrderDate ($R_1, R_2, \ldots R_N$) may be added to the Set Universe 450. For example, the data set identifiers indicated at 460 in FIG. 4B may represent component data sets added to the Set Universe 450 based on the indirect partitioning. In this example, each component may be a clan equal to the collection of extended sets corresponding to the line items within the component. Algebraic relations may also be added to the Algebraic Cache 452 indicating that the data set has been partitioned, such as Line Items=partition($R_1, R_2, \ldots R_N$), where $R_N$ indicates distinct ranges of values for O_OrderDate. An algebraic relation may also be composed that specifies that the original data set is equal to the union of the components, such as Line Items=union($LC_1, LC_2, \ldots LC_N$). For example, the algebraic relations indicated at 470 in FIG. 413 may represent algebraic relations added to the Algebraic Cache 452 that reference the component data sets. A partition data set may also be defined and an algebraic relation may be composed that specifies that the partition data set ($P_1(L)$) is equal to the collection of the components, such as $P_1(L)=\{LC_1, LC_2, \ldots LC_N\}$. For example, the data set identifier indicated at 465 in FIG. 4B may represent the partition data set added to the Set Universe 450 and the algebraic relation indicated at 475 in FIG. 4B may represent the algebraic relation added to the Algebraic Cache 452 that references the partition data set. In this example, the Partition Data Set is a hoard. It is a collection of components, where each component is a clan. The above examples use a simplified notation for illustrative purposes. A different internal representation may be used by the system in example embodiments.

In some examples, the above approach of scanning and evaluating each member of Line Items for indirect partitioning may not be efficient and may not facilitate further partitioning of each component, because the components would not include the O_OrderDate. If a pattern of restrictions against a particular component is identified, there would not be a way to further partition the component without rescanning and evaluating all of the members of the component. In some examples, algebraic relations may be added to the Algebraic Cache 452 to indicate the order date for each line item in the component to facilitate further partitioning of the component in the future.

In another embodiment, Partitioning Module 430 may perform indirect partitioning by performing a Join operation on the first data set and the second data set as indicated at 1106 in FIG. 1B. A Join operation is the equivalent of a cross-union followed by a restriction. The joined data set may then be directly partitioned based on the constituent(s) of the first data set (because the joined data set will include those constituent(s) as well as the constituents of the second data set). For example, in order to indirectly partition the Line Items data set, a new data set, $L_1$, may be defined that is equal to a join of Orders and Line Items: $L^1$=Join (Orders, Line Items). In example embodiments, new data sets may be defined as a result of indirect partitioning and stored in the Set Universe 450 and new algebraic may be composed and stored in the Algebraic Cache 452 based on the joined data set $L^1$. For example, an algebraic relation may be added indicating that $L^1$=Join (Orders, Line Items). A component data set for each component of the partition and a partition data set that is the collection of the component data sets may be defined and stored in the Set Universe 450. For example, a data set for each component of the joined data set ($L^1C_1, L^1C_2, \ldots L^1C_N$) that has been partitioned by ranges of O_OrderDate ($R_1, R_2, \ldots R_N$) may be added to the Set Universe 450. In this example, each component may be a clan equal to the collection of extended sets within the component. Each of these components includes the components of the second data set, Line Items, as well as components of the first data set, Orders, that would result from partitioning based on the specified ranges. Algebraic relations may also be added to the Algebraic Cache 452 indicating that the joined data set has been partitioned, such as $L^1$=partition($R_1, R_2, \ldots R_N$), where $R_N$ indicates distinct ranges of values for O_OrderDate. An algebraic relation may also be composed that specifies that the joined data set is equal to the union of the components, such as $L^1$=union($L^1C_1, L^1C_2, \ldots L^1C_N$). A partition data set may also be defined and an algebraic relation may be composed that specifies that the partition data set ($P_1(L^1)$) is equal to the collection of the components, such as $P_1(L^1)=\{L^1C_1, L^1C_2, \ldots L^1C_N\}$. In this example, the Partition Data Set is a hoard. It is a collection of components, where each component is a clan.

In some example embodiments, elements may be deleted from the joined data set that are not required for indirect partitioning as indicated at 1108 in FIG. 1B. For example, elements from Orders that are not used from partitioning may be deleted before the joined data set is partitioned. This reduces the size of the data sets resulting from the indirect partitioning. For example, a new data set $L^2$ can be defined based on the joined data set $L^1$ that includes all of the elements of Line Item and only the O_OrderDate element from the Orders data set. Instead of using $L^1$ to compose the new data sets and algebraic relations to be added based on partitioning, the new set $L^2$ would be used as indicated at 1110 in FIG. 1B. For example, the component data set added to the Set Universe would be $L^2C_1, L^2C_2, \ldots L^2C_N$. Similarly, the partition data set would be $P_1(L^2)=\{L^2C_1, L^2C_2, \ldots L^2C_N\}$. Each of these components would still include the corresponding component of Line Items that would result from partitioning based on the specified ranges, but would only include the O_OrderDate from the Orders data set for each line item. These components could be further partitioned based on O_OrderDate, but would not include other elements from Orders that were not used for partitioning. The component data sets, partition data set and algebraic relations resulting from the partitioning of $L^2$ are then added to the Set Universe 450 and Algebraic Cache 452. This is an example only and other embodiments may use different subsets of the joined data set for partitioning.

After direct and indirect algebraic partitioning, the new data sets and algebraic relations are available for use in calculating the requested data set as well as for future optimizations in responding to subsequent request. As described above, the Optimizer may compose collections of algebraic relations that define a data set equal to the requested data set. The collections of algebraic relations may reference some of the new data sets and algebraic relations that resulted from direct and indirect algebraic partitioning (and may be used in combination with other algebraic relations from the Algebraic Cache 452) as indicated at 1036 in FIG. 1A. For example, the statement requesting line items based on Order Date in Table 1 above may be calculated from a collection of algebraic relations that uses one or more components of Line Items that resulted from indirect algebraic partitioning. In some examples, these components may be components of a joined data set that was partitioned such as $L^1C_N$ or $L^2C_N$ as described above. The components required to respond to the request can be determined from the restriction term in the original statement. For example, the statement in Table 1 above includes a restriction term as follows: O_OrderDate>=Jan. 1, 1996 and <Feb. 1, 1996. The restriction term from the statement may be intersected against the components of the partition to determine which components are needed to calculate the requested data set as indicated at 1114 in FIG. 1B. In example embodiments, this is performed by the Set Processor 404 algebraically at processor speeds without retrieving and inspecting the underlying data sets from storage. If the intersection is null, the components do not need to be retrieved from storage to respond to the request. However, if a first component, $L^2C_1$, includes line items for orders having order dates from Dec. 15, 1995 through Jan. 15, 1996 and a second component, $L^2C_1$, includes line items for orders having order dates from Dec. 15, 1995 through Jan. 15, 1996, they would both intersect the restriction term O_OrderDate>=Jan. 1, 1996 and <Feb. 1, 1996. As a result, both components, $L^2C_1$ and $L^2C_2$, would be needed to calculate the requested data set. These components may be used to compose collection(s) of algebraic relations that may be used to calculate the requested data set as indicated at 1116 in FIG. 1B. In example embodiments, the collection of algebraic relations referencing these components may be selected by the Optimizer 418 and passed to the Set Processor 404 to calculate the requested data set as indicated at 1038 in FIG. 1A and at 1118 in FIG. 1B.

If this collection of algebraic relations is selected for calculating the requested data set and the components have not been realized in storage, they may need to be calculated from the original data sets, Orders and Line Items, or other data sets that are available (such as $L^2$ if that data set has already been calculated). While this may have a cost for calculation, the data sets (such as Orders and Line Items) may need to be retrieved from storage to respond to the original request whether or not partitioning had been performed. Once the data sets are retrieved, the required components can be calculated to return the requested data sets. These components may also be provided to the Storage Manager and realized in storage as indicated at 1118 in FIG. 1B. Since the data sets required to calculate components has already been retrieved from storage, they can also be retained and used to calculate other components of the partition as indicated at 1120 in FIG. 1B. In some example embodiments, the system may proceed to process other statements and perform other partitioning as indicated by arrow 1122 in FIG. 1B. The other components may be calculated in the background using available processor cycles as indicated at 1120 in FIG. 1B. These components may also be provided to the Storage Manager and realized in storage. This results in physical partitioning where the components are available in storage for use as components in responding to subsequent requests. In the future, when these components are required, only the components need to be retrieved from storage rather than the whole data set. In example embodiments, the Optimizer essentially replaces references to the full data sets with only the required components needed to respond to the particular request. This reduces the amount of data that needs to be retrieved and examined in responding to the requests. By performing indirect partitioning, the system expands the circumstances where the advantages of partitioning can be realized. When there is a pattern of requests that use a first data set to restrict a second data set, these optimizations can greatly improve performance of the system. For example, when a secondary data set is partitioned into ten components based on ranges of a constituent from a primary data set, a performance improvement of almost ten times can be realized in some cases where the full data set would otherwise be required to be retrieved from storage, particularly where the I/O channel from storage is relatively slow.

In example embodiments, because partitioning may be carried out algebraically, multiple different partitions can be defined for the same data set. The algebraic relations stored by the system may be used to determine that the same logical data is available from different physical data sets realized in storage. The physical data sets may contain the same logical data, but may be stored in different physical components and in different physical formats in the storage system. Since algebraic relations are maintained that define the relations between different data sets, the same logical data may be partitioned many different ways both algebraically and physically in storage. For example, the Partitioning Module 430 may define components of Orders or Line Items (or a joined set based on Line Items) based on ranges of the order date as described above. The Partitioning Module 430 may also detect other patterns for partitioning Orders or Line Items. For example, Partitioning Module 430 may also directly partition Orders based on another constituent of Orders, such as O_ShipDate, and/or may indirectly partition Line Items (or a joined set based on Line Items) based on the O_ShipDate for the corresponding orders. These partitions may be defined algebraically as well as being realized in the Data Store 425 to provide additional alternatives for calculating and responding to subsequent requests for data from based on the Orders data set and Line Items data set. In example embodiments, the system is not constrained by a particular structure used to store a data set in storage. Some requests may be optimized by using component(s) of Line Items based on order date to calculate the requested data set. Other requests may be optimized by using component(s) of Line Items based on ship date to calculate the requested data set or some combination of the two.

In example embodiments, the addition and deletion of elements from a data set is not constrained by the structure of components realized in the Data Store 425. In a system that performs only physical partitioning and tightly couples the data sets to the structure in which they are stored, the addition or deletion of elements may require adding the elements to, or deleting the elements from, the particular physical component in storage. In some example embodiments, the existing data sets and algebraic relations are not deleted or altered as new statements are received by the system. Instead, new data sets and algebraic relations are composed and added to the Set Manager 402 as new statements are received. For example, if data is requested to be added to a data set, a new GUID can be added to the Set Universe 450 and defined in the Algebraic Cache 452 as the union of the original data set and the data to be added. For example, a statement may specify a number of new line items to be added to the Line Items data set. This may be specified using an external identifier for the Line Items data set that does not distinguish between the state of the Line Items data set at different points in time. The internal representations of Line Items may include data sets representing the state of Line Items at different points in time (for example, based on temporal information included in the Set Universe 450). Each of these data sets may have its own GUID. For example, using a simplified notation, the data set for Line Items at time $T_1$ may be denoted as $L(T_1)$. When the new line items (denoted as New) are added, a new data set may be defined and assigned a new GUID for Line Items at time $T_2$, $L(T_2)$. An algebraic relation may be added to the Algebraic Cache 452 indicating that $L(T_2)$=union($L(T_1)$, New($T_2$)). In addition, where L has been indirectly partitioned into components of L, such as $LC_N$, or components of a joined data set, such as $L^1C_N$ or $L^2C_N$, algebraic relations may also be added to specify the relationship of the new elements to the components. Algebraic operations may be used to determine an algebraic relation for new components that include the new elements without requiring re-partitioning of the whole data set and without requiring the new elements to be inserted into the components in physical storage. For example, components of the new elements may be defined, such as New($T_2$) =partition($R_1, R_2, \ldots R_N$), where $R_N$ indicates the same ranges of values used to partition $L(T_1)$. If Line Items was partitioned based on a joined data set, the components of the new elements, New($T_2$), may also be determined by joining New($T_2$) with Orders. Algebraic relations can then be added to specify new components of Line Items at time $T_2$ as follows: $L(T_2)C_N$=union($L(T_1)C_N$, New($T_2$) $C_N$). The components for the new elements, New($T_2$) $C_N$, can also be realized in the data store. This may be done when the new data is submitted to the system or at other times when it is retrieved and made available to the Set Processor 404.

Similarly, if data is requested to be deleted from a data set, a new GUID can be added to the Set Universe 450 and defined in Algebraic Cache 452 as the restriction of the data to be deleted from the original data set. For example, a statement may specify a number of existing line item elements to be removed from the Line Items data set. This may be specified using an external identifier for the Line Items data set that does not distinguish between the state of the Line Items data set at different points in time. The internal representations of Line Items may include data sets representing the state of Line Items at different points in time (for example, based on temporal information included in the Set Universe 450). Each of these data sets may have its own GUID. For example, using a simplified notation, the data set for Line Items at time $T_1$ may be denoted as $L(T_1)$ and the elements to be removed denoted as Del. When the Line Items elements to be removed are removed, a new data set may be defined and assigned a new GUID for Line Items at time $T_2$, $L(T_2)$. An algebraic relation may be added to the Algebraic Cache 452 indicating that $L(T_2)$=Restrict($L(T_1)$, Not(Del($T_2$))). There are other ways of expressing this relation including $L(T_2)$=NotExist(L($T_1$), Del($T_2$)). In addition, where L has been indirectly partitioned into components of L, such as $LC_N$, or components of a joined data set, such as $L^1C_N$ or $L^2C_N$, algebraic relations may also be added to specify the relationship of the deleted data to the components. Algebraic operations may be used to determine an algebraic relation for new components that exclude the deleted elements without requiring re-partitioning of the whole data set and without requiring the new elements to be deleted from the components in physical storage. For example, components of the elements to be deleted may be defined, such as Del($T_2$)=partition($R_1, R_2, \ldots R_N$), where $R_N$ indicates the same ranges of values used to partition $L(T_1)$. If Line Items was partitioned based on a joined data set, the components of the elements to be deleted, Del($T_2$) may also be determined by joining Del($T_2$) with Orders. Algebraic relations can then be added to specify new components of Line Items at time $T_2$ as follows: $L(T_2)C_N$=Restrict ($L(T_1)C_N$, Not(Del($T_2$)$C_N$)). The components for the elements to be deleted can also be realized in the data store. This may be done when the delete request is submitted or at other times when it is retrieved and made available to the Set Processor 404.

This approach for adding and deleting elements to directly and indirectly partitioned data sets allows for temporal invariance and also allows elements to be added and deleted efficiently even though a number of different partitions may exist in the Algebraic Cache 452 and in the Data Store 425 for a particular data set.

Figure 2B:
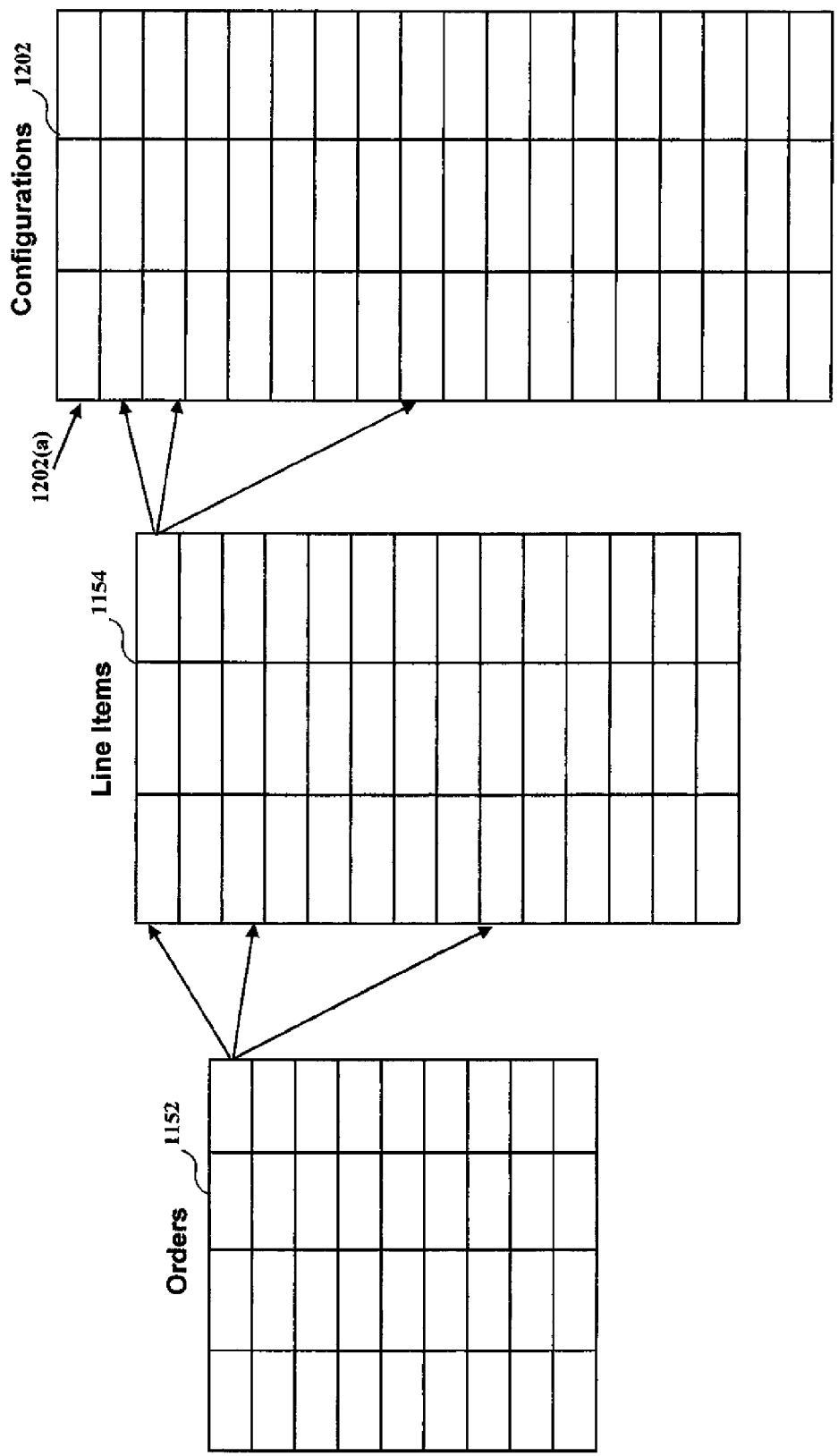
FIG. 2B shows three example data sets, Orders, Line Items and Configurations, used to illustrate indirect partitioning according to an example embodiment.

In example embodiments, a data set may also be indirectly partitioned based on a relationship with more than one other data set. For example, FIG. 2B shows a third data set, Configurations 1202. The Configurations data set 1202 may include data about various configuration options selected by the customer for the particular line item that was ordered. Each member of the Configurations data set (illustrated as a row 1202(a) in FIG. 2B) may include data about a configuration option selected by the customer. In this example, each line item in the Line Items data set may have one or more configuration options specified in the Configurations data set. For example, Line Items may have a primary key, L_LineItemKey, and each member of Configurations may have a foreign key, C_LineItemKey. Since there is a one-to-one or one-to-many relationship between Line Items and Configurations, one or more constituent(s) of Line Items may be used to indirectly partition the Configurations data set as described above. In addition, since there is an indirect one-to-one or one-to-many relationship between Orders and Configurations, one or more constituent(s) of Orders may be used to indirectly partition the Configurations data set. The relationship between Orders and Configurations may be specified in a statement, such as O_OrderKey=L_OrderKey, L_LineItemKey=C_LineItemKey, or may be determined from the Algebraic Cache 452. Partitioning Module 430 may evaluate this relationship and determine that it is a one-to-one or one-to-many relationship eligible for indirect partitioning. For example, Partitioning Module 430 may determine that O_OrderKey is unique for each member of Orders and L_LineItemKey is unique for each member of Line Items using the methods described above. In some examples, indirect partitioning of Configurations may be performed by defining a joined data set equal to a join of Orders, Line Items and Configurations. Elements of the joined data set could be removed that are not used for partitioning. For example, for partitioning based on order date, all elements of Orders and Line Items other than the O_OrderDate may be removed from the joined data set. The resulting data set (including O_OrderDate and the elements of Configurations) could then be partitioned into components based on O_OrderDate.

In another example, a joined data set that has been used to indirectly partition Line Items (such as $L^1$ or $L^2$ from the examples above) may already be defined that includes O_OrderDate and the elements of Line Items. One of these joined data sets (such as $L^1$ or $L^2$ from the examples above) may, in turn, be joined with Configurations. The elements of Line Items could then be optionally removed if they will not be used for partitioning of Configurations. The resulting data set can then be partitioned to define components that include components of Configurations based on O_OrderDate. In this example, these components would also include O_OrderDate which facilitates further partitioning of these components if desired. In example embodiments, constituents from any number of data sets can be used to indirectly partition a particular data set. For example, constituents of Orders, Line Items or some combination may be used to indirectly partition Configurations in some embodiments. The components of Configurations that are composed algebraically may then be used for optimizations. The components may also be realized in the data store as they are calculated, resulting in physical partitioning of Configurations. This can be used to reduce the amount of data that needs to be retrieved from the Data Store 425 to calculate future restrictions of Configurations based on order date.

Figure 2C:
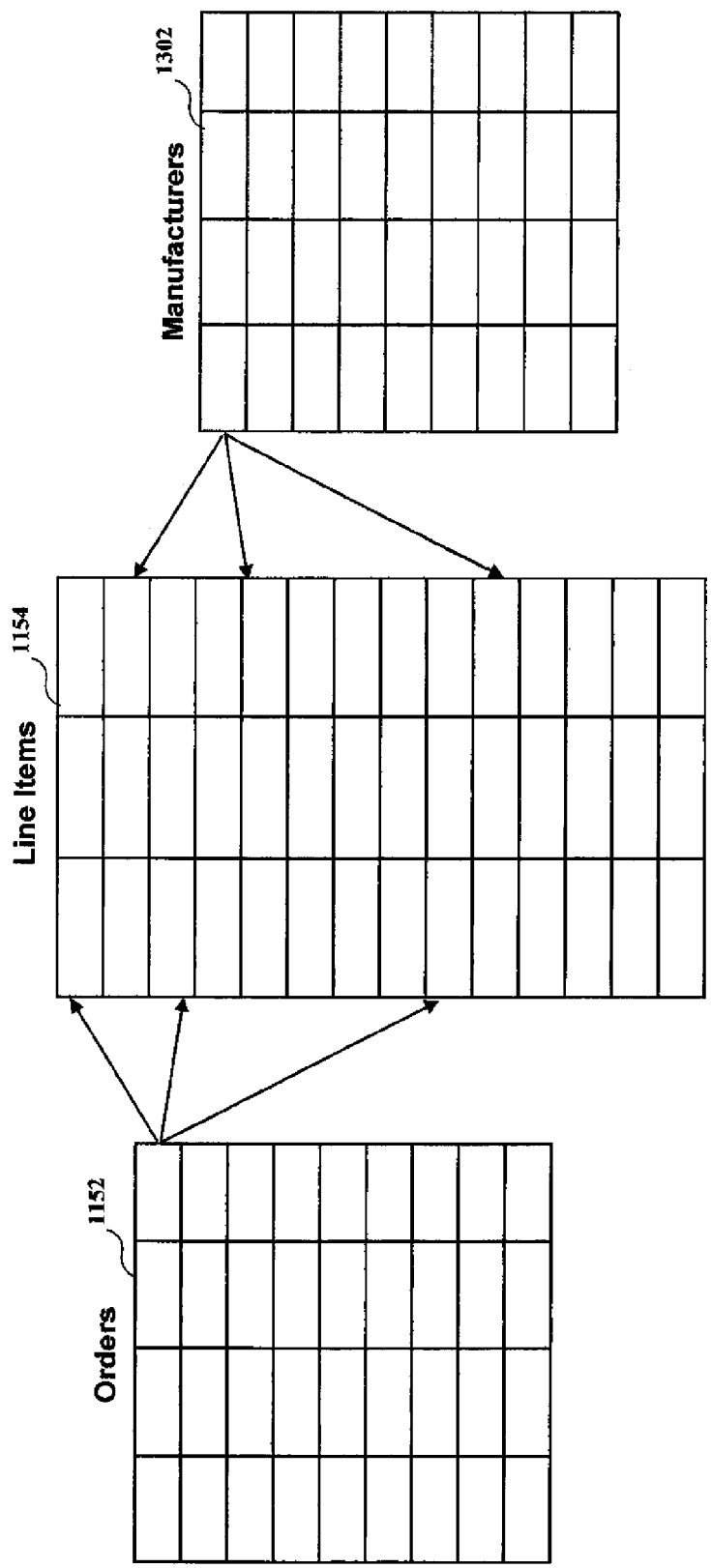
FIG. 2C shows three example data sets, Orders, Line Items and Manufacturers, used to illustrate indirect partitioning according to an example embodiment.

In example embodiments, more than one primary data set may exist that can be used to indirectly partition a secondary data set. For example, FIG. 2C shows an additional data set, Manufacturers 1302. The Manufacturers data set 1302 may include data regarding manufacturers who manufacture the items listed in the Line Items data set 1154. Each manufacturer may manufacture one or more of the items included in the Line Items data set 1154. As a result, Partitioning Module 430 may determine that there is a one-to-one or one-to-many relationship between'Manufacturers 1302 and Line Items 1154 permitting Line Items to be indirectly partitioned based on one or more constituents of Manufacturers. As described above, there may also be a one-to-one or one-to-many relationship between Orders 1152 and Line Items 1154 permitting Line Items to be indirectly partitioned based on one or more constituents of Orders. As described above, indirect partitioning may be performed multiple times and partitions of Line Items may be defined in the Algebraic Cache based on both constituent(s) of Manufacturers 1302 and Orders 1152. The components of each resulting partition may be used when optimizing for statements that include a corresponding restriction (for example, based on manufacturer or order date). In some cases, a statement may be received that includes restrictions based on both data sets. For example, Table 2 below shows an example request that includes a restriction of Line Items based on O_OrderDate as well as a restriction based on M_Manufacturer.

TABLE 2

Select: L_Item
From: Orders, Line Items, Manufacturers
Where: O_OrderDate >= January 1, 1996 and < February 1, 1996
and O_OrderKey = L_OrderKey
and L_ManufacturersKey = M_ManufacurersKey
and M_Manufacturer = "ACME Corp."

In some example embodiments, alternative collections of algebraic relations may be composed that define a result equal to the requested data set. One of the collections may include relations referencing the components of Line Items resulting from indirect partitioning based on O_OrderDate. Another collection may include relations referencing the components of Line Items resulting from indirect partitioning based on M_Manufacturer. The Optimizer may then select the collection with the lowest cost to calculate the requested data set. In another embodiment, the partition that is selected may be determined based on the size of the range used for each restriction in the statement (e.g., the size of the range used to restrict O_OrderDate (>=Jan. 1, 1996 and <Feb. 1, 1996) and the size of the range used to restrict M_Manufacturer (="ACME Corp."). This can be compared as a ratio to the total range of values for the respective constituent in the data set. For example, for O_OrderDate, this would be the number of order dates that fall within the restricted range (for example, the month of January) compared to total range of all order dates in the Orders data set. Similarly, for M_Manufacturer, this would be the number of manufacturers that fall within the restricted range (which would be a single manufacturer, "ACME Corp.") compared to the total number of manufacturers in the Manufacturers data set. In an example embodiment, the restriction providing the smallest size/range ratio would be most likely to intersect with the fewest number of components. Accordingly, in some embodiments, the restriction with the smallest ratio is used for indirect partitioning of Line Items. In this example, components defined based on the restriction with the smallest ration may be used to calculate the requested data set. In other embodiments, this may be a factor, but may not be determinative. For example, the components from a different partition may be used if they have a lower cost. This may be the case if they are already available to the Set Processor 404 and do not need to be retrieved from storage.

The mathematical data model used in the above examples allows embodiments to be used in a wide variety of computer architectures and systems and naturally lends itself to massively-parallel computing and storage systems. Some example computer architectures and systems that may be used in connection with example embodiments are described below in connection with FIGS. 3A, 3B and 3C. In these example embodiments, Partitioning Module 430 and other modules of the system may include computer program instructions stored on a computer readable medium, such as a hard disk or other data storage. The computer program instructions may be loaded into high speed memory, such as a RAM, for execution by one or more processors to perform the functionality of the modules. For example, computer program instructions of the Partitioning Module 430 may be loaded into RAM and executed by one or more processors to automatically detect and evaluate conditions for direct and indirect partitioning and, in response to determining that those conditions have been met, automatically perform direct and indirect algebraic and physical partitioning of data sets as described above. The computer program instructions of the Optimizer 418 and Set Processor 404 (including Partition Calculation Module 435 in some embodiments) may also be loaded into RAM and executed by one or more processors to compose collections of algebraic relations based on the data sets and algebraic relations resulting from direct and indirect partitioning and to calculate requested data sets to be returned to the user in response to queries submitted to the system.

Figure 3A:
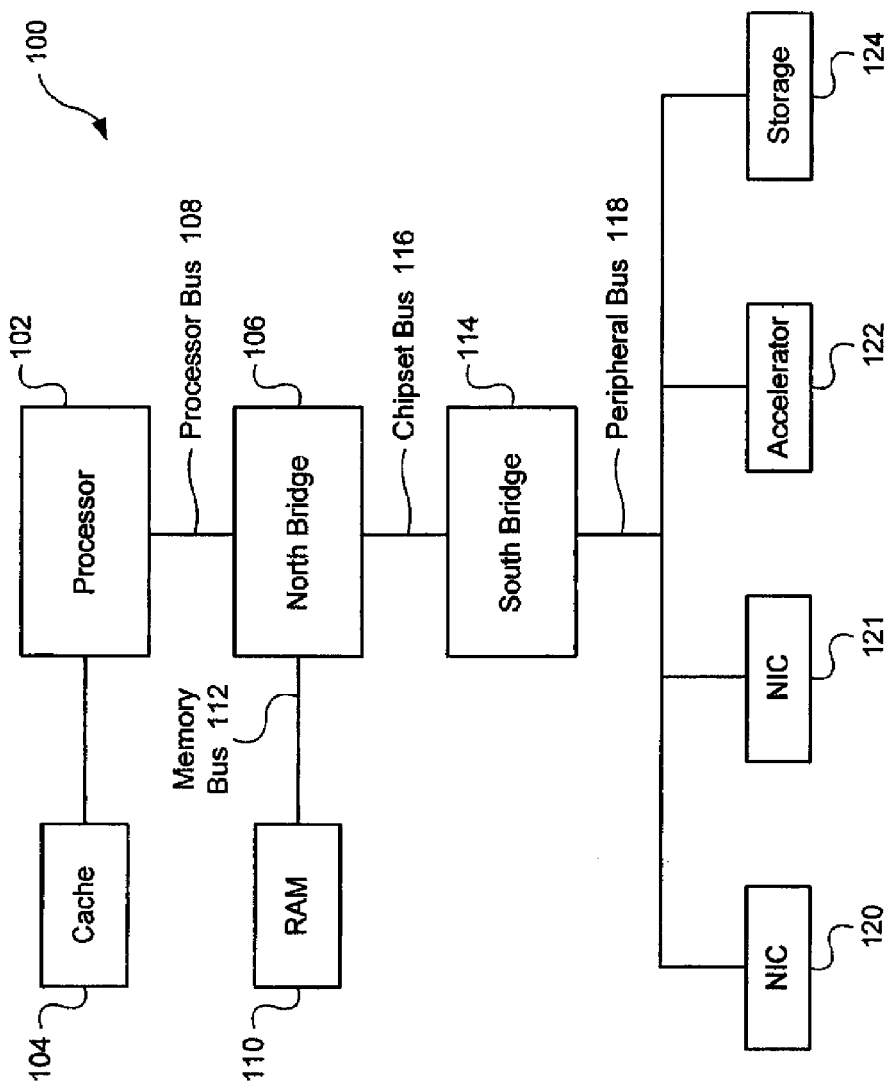
FIG. 3A is a block diagram showing a first example architecture of a computer system that may be used in connection with example embodiments for direct and indirect partitioning.

FIG. 3A is a block diagram showing a first example architecture of a computer system 100 that may be used in connection with example embodiments. As shown in FIG. 3A, the example computer system may include a processor 102 for processing instructions, such as an Intel Xeon™ multi-core processor, AMD Opteron™ multi-core processor or other processor. Multiple threads of execution may be used for parallel processing. In some embodiments, multiple processors or other processors with multiple cores may also be used, whether in a single computer system, in a cluster or distributed across systems over a network.

As shown in FIG. 3A, a high speed cache 104 may be connected to, or incorporated in, the processor 102 to provide a high speed memory for instructions or data that have been recently, or are frequently, used by processor 102. The processor 102 is connected to a north bridge 106 by a processor bus 108. The north bridge 106 is connected to random access memory (RAM) 110 by a memory bus 112 and manages access to the RAM 110 by the processor 102. The north bridge 106 is also connected to a south bridge 114 by a chipset bus 116. The south bridge 114 is, in turn, connected to a peripheral bus 118. The peripheral bus may be, for example, PCI, PCI-X, PCI Express or other peripheral bus. The north bridge and south bridge are often referred to as a processor chipset and manage data transfer between the processor, RAM and peripheral components on the peripheral bus 118. In some alternative architectures, the functionality of the north bridge may be incorporated into the processor instead of using a separate north bridge chip.

In some embodiments, system 100 may include an accelerator card 122 attached to the peripheral bus 118. The accelerator may include field programmable gate arrays (FPGAs) or other hardware for accelerating certain processing. For example, an accelerator may be used for adaptive data restructuring or to evaluate algebraic expressions used in extended set processing.

Software and data are stored in external storage 124 and may be loaded into RAM 110 and/or cache 104 for use by the processor. The system 100 includes an operating system for managing system resources, such as Linux or other operating system, as well as application software running on top of the operating system for managing data storage and optimization in accordance with example embodiments of the present invention.

In this example, system 100 also includes network interface cards (NICs) 120 and 121 connected to the peripheral bus for providing network interfaces to external storage such as Network Attached Storage (NAS) and other computer systems that can be used for distributed parallel processing.

Figure 3B:
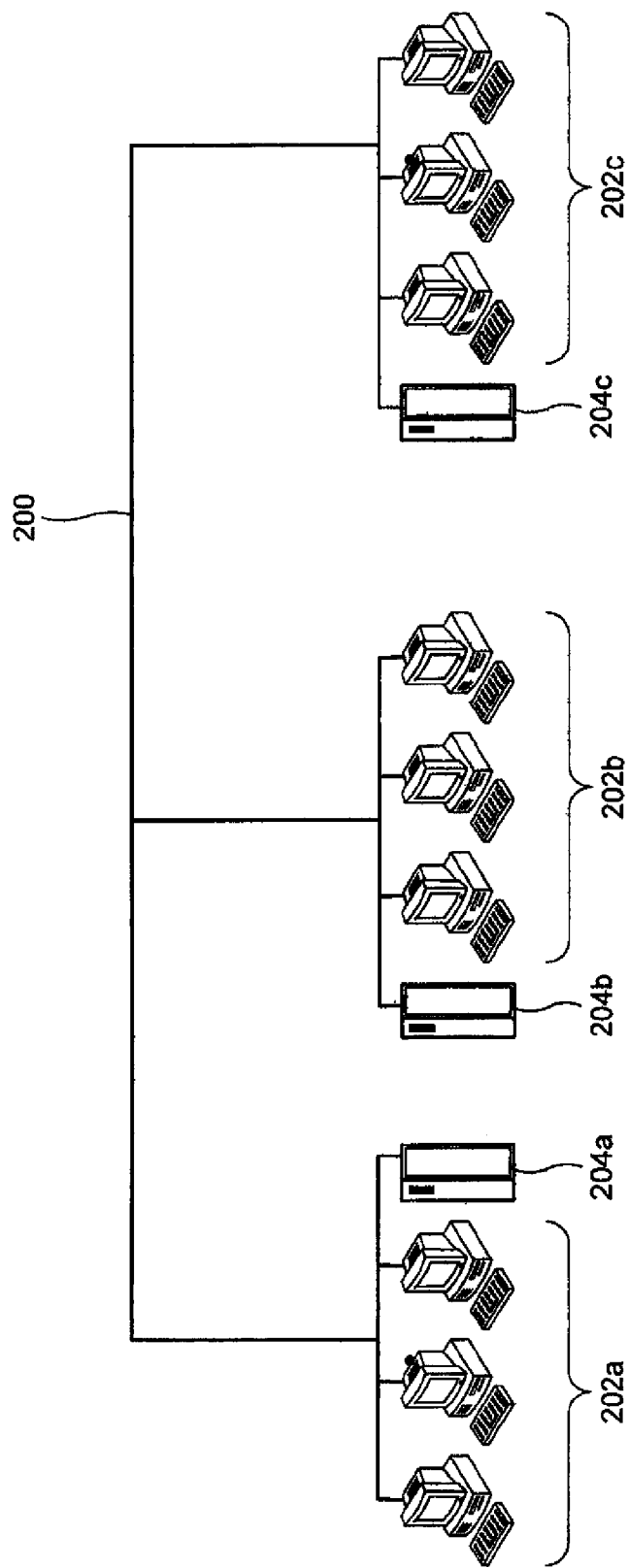
FIG. 3B is a block diagram showing a computer network that may be used in connection with example embodiments for direct and indirect partitioning.

FIG. 3B is a block diagram showing a network 200 with a plurality of computer systems 202 a, b and c and Network Attached Storage (NAS) 204 a, b and c. In example embodiments, computer systems 202 a, b and c may manage data storage and optimize data access for data stored in Network Attached Storage (NAS) 204 a, b and c. A mathematical model may be used for the data and be evaluated using distributed parallel processing across computer systems 202 a, b and c. Computer systems 202 a, b and c may also provide parallel processing for adaptive data restructuring of the data stored in Network Attached Storage (NAS) 204 a, b and c. This is an example only and a wide variety of other computer architectures and systems may be used. For example, a blade server may be used to provide parallel processing. Processor blades may be connected through a back plane to provide parallel processing. Storage may also be connected to the back plane or as Network Attached Storage (NAS) through a separate network interface.

In example embodiments, processors may maintain separate memory spaces and transmit data through network interfaces, back plane or other connectors for parallel processing by other processors. In other embodiments, some or all of the processors may use a shared virtual address memory space.

Figure 3C:
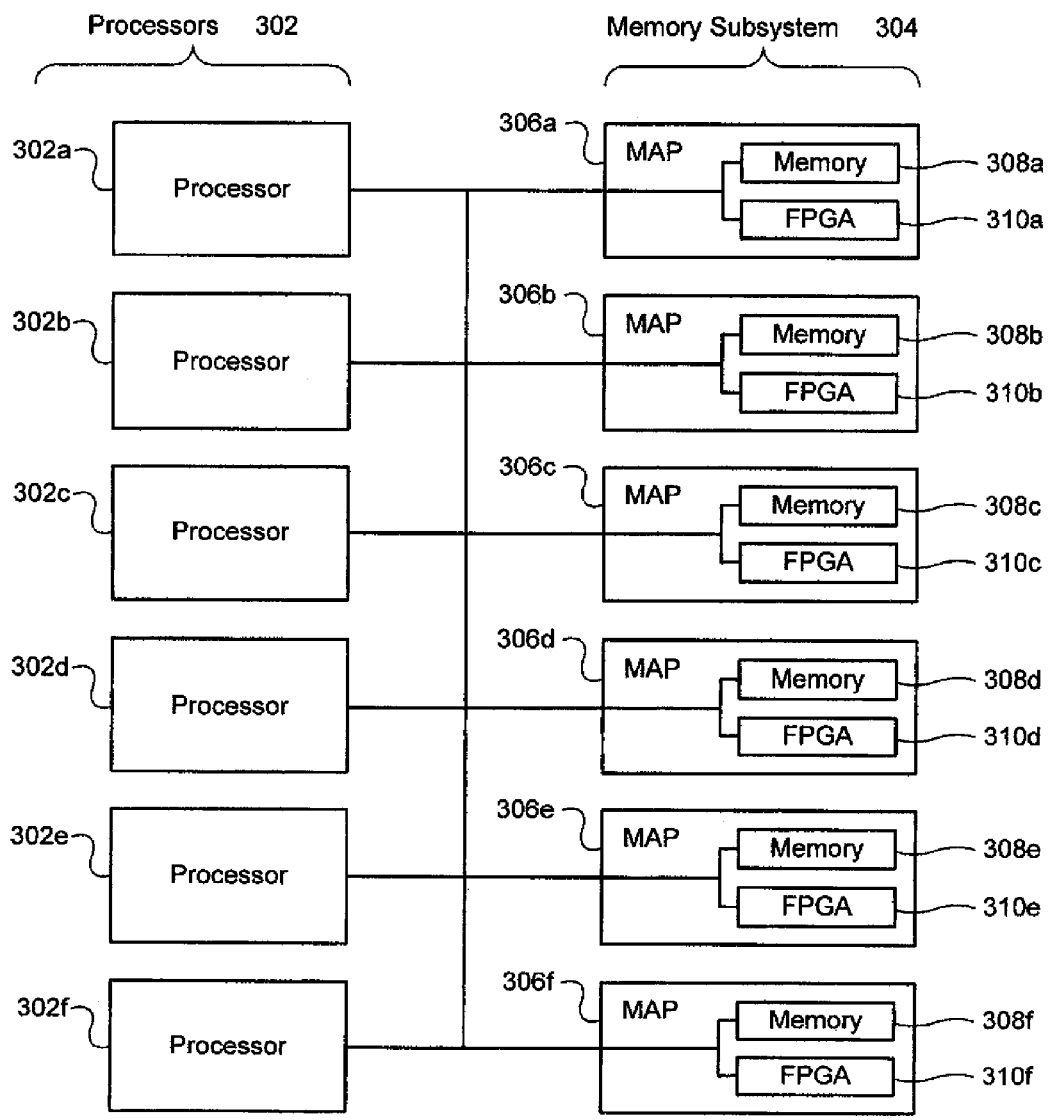
FIG. 3C is a block diagram showing a second example architecture of a computer system that may be used in connection with example embodiments for direct and indirect partitioning.

FIG. 3C is a block diagram of a multiprocessor computer system 300 using a shared virtual address memory space in accordance with an example embodiment. The system includes a plurality of processors 302a-f that may access a shared memory subsystem 304. The system incorporates a plurality of programmable hardware memory algorithm processors (MAPs) 306 a-f in the memory subsystem 304. Each MAP 306 a-f may comprise a memory array 308 a-f and one or more field programmable gate arrays (FPGAs) 310 a-f. The MAP provides a configurable functional unit and particular algorithms or portions of algorithms may be provided to the FPGAs 310 a-f for processing in close coordination with a respective processor. For example, the MAPs may be used to evaluate algebraic expressions regarding the data model and to perform adaptive data restructuring in example embodiments. In this example, each MAP is globally accessible by all of the processors for these purposes. In one configuration, each MAP can use Direct Memory Access (DMA) to access an associated memory array, allowing it to execute tasks independently of, and asynchronously from, the respective microprocessor 302. In this configuration, a MAP may feed results directly to another MAP for pipelining and parallel execution of algorithms.

The above computer architectures and systems are examples only and a wide variety of other computer architectures and systems can be used in connection with example embodiments, including systems using any combination of general processors, co-processors, FPGAs and other programmable logic devices, system on chips (SOCs), application specific integrated circuits (ASICs) and other processing and logic elements. It is understood that all or part of the data management and optimization system may be implemented in software or hardware and that any variety of data storage media may be used in connection with example embodiments, including random access memory, hard drives, flash memory, tape drives, disk arrays, Network Attached Storage (NAS) and other local or distributed data storage devices and systems.

In example embodiments, the data management and optimization system may be implemented using software modules executing on any of the above or other computer architectures and systems. In other embodiments, the functions of the system may be implemented partially or completely in firmware, programmable logic devices such as field programmable gate arrays (FPGAs) as referenced in FIG. 3C, System on Chips (SOCs), application specific integrated circuits (ASICs), or other processing and logic elements. For example, the Set Processor and Optimizer (including Partitioning Module 430 and Partition Calculation Module 435 in some embodiments) may be implemented with hardware acceleration through the use of a hardware accelerator card, such as accelerator card 122 illustrated in FIG. 3A.

The operation of the modules shown in FIG. 4A will now be described in additional detail. As described above, these modules may be used in combination with the Partitioning Module 430 and Partition Calculation Module 435 to automatically perform direct and indirect partitioning and other optimizations for calculating requested data sets and returning them to the user. FIG. 4A is a block diagram illustrating the logical architecture of example software modules 400. The software is component-based and organized into modules that encapsulate specific functionality as shown in FIG. 4A. This is an example only and other software architectures may be used as well.

In this example embodiment, data natively stored in one or more various physical formats may be presented to the system. The system creates a mathematical representation of the data based on extended set theory and may assign the mathematical representation a Global Unique Identifier (GUID) for unique identification within the system. In this example embodiment, data is internally represented in the form of algebraic expressions applied to one or more data sets, where the data may or may not be defined at the time the algebraic expression is created. The data sets include sets of data elements, referred to as members of the data set. In an example embodiment, the elements may be data values or algebraic expressions formed from combinations of operators, values and/or other data sets. In this example, the data sets are the operands of the algebraic expressions. The algebraic relations defining the relationships between various data sets are stored and managed by a Set Manager 402 software module. Algebraic integrity is maintained in this embodiment, because all of the data sets are related through specific algebraic relations. A particular data set may or may not be stored in the system. Some data sets may be defined solely by algebraic relations with other data sets and may need to be calculated in order to retrieve the data set from the system. Some data sets may even be defined by algebraic relations referencing data sets that have not yet been provided to the system and cannot be calculated until those data sets are provided at some future time.

In an example embodiment, the algebraic relations and GUIDs for the data sets referenced in those algebraic relations are not altered once they have been created and stored in the Set Manager 402. This provides temporal invariance which enables data to be managed without concerns for locking or other concurrency-management devices and related overheads. Algebraic relations and the GUIDs for the corresponding data sets are only appended in the Set Manager 402 and not removed or modified as a result of new operations. This results in an ever-expanding universe of operands and algebraic relations, and the state of information at any time in its recorded history may be reproduced. In this embodiment, a separate external identifier may be used to refer to the same logical data as it changes over time, but a unique GUID is used to reference each instance of the data set as it exists at a particular time. The Set Manager 402 may associate the GUID with the external identifier and a time stamp to indicate the time at which the GUID was added to the system. The Set Manager 402 may also associate the GUID with other information regarding the particular data set. This information may be stored in a list, table or other data structure in the Set Manager 402 (referred to as the Set Universe in this example embodiment). The algebraic relations between data sets may also be stored in a list, table or other data structure in the Set Manager 402 (referred to as the Algebraic Cache in this example embodiment). In example embodiments, the Set Manager 402 may specifically include information regarding data sets and algebraic relations that are composed from direct and indirect algebraic partitioning as described above.

In some embodiments, Set Manager 402 can be purged of unnecessary or redundant information, and can be temporally redefined to limit the time range of its recorded history. For example, unnecessary or redundant information may be automatically purged and temporal information may be periodically collapsed based on user settings or commands. This may be accomplished by removing all GUIDs from the Set Manager 402 that have a time stamp before a specified time. All algebraic relations referencing those GUIDs are also removed from the Set Manager 402. If other data sets are defined by algebraic relations referencing those GUIDs, those data sets may need to be calculated and stored before the algebraic relation is removed from the Set Manager 402.

In one example embodiment, data sets may be purged from storage and the system can rely on algebraic relations to recreate the data set at a later time if necessary. This process is called virtualization. Once the actual data set is purged, the storage related to such data set can be freed but the system maintains the ability to identify the data set based on the algebraic relations that are stored in the system. In one example embodiment, data sets that are either large or are referenced a certain threshold number of times may be automatically virtualized. These settings could be user-configurable or system-configurable. For example, if the Set Manager 402 contained a data set A as well as the algebraic relation that A equals the intersection of data sets B and C, then the system could be configured to purge data set A from the Set Manager 402 and rely on data sets B and C and the algebraic relation to identify data set A when necessary. In another example embodiment, if two or more data sets are equal to one another, all but one of the data sets could be deleted from the Set Manager 402. This may happen if multiple sets are logically equal but are in different physical formats. In such a case, all but one of the data sets could be removed to conserve physical storage space. In example embodiments, virtualization may be used in combination with direct and indirect partitioning. For example, when component data sets for a partition have been realized in the Data Store 425, the original data set may be removed. The component data sets may be used to respond to queries based on the original data set or may be used to calculate the original data set if needed. The algebraic relation added to the Algebraic Cache 452 indicating that the original data set is the union of the component data sets may be used to recreate the original data set if needed.

When the value of a data set needs to be calculated or provided by the system, an Optimizer 418 may retrieve algebraic relations from the Set Manager 402 that define the data set. The Optimizer 418 can also generate additional equivalent algebraic relations defining the data set using algebraic relations from the Set Manager 402. Then the most efficient algebraic relation can then be selected for calculating the data set.

A Set Processor 404 software module provides an engine for performing the arithmetic and logical operations and functions required to calculate the values of the data sets represented by algebraic expressions and to evaluate the algebraic relations. The Set Processor 404 also enables adaptive data restructuring. As data sets are manipulated by the operations and functions of the Set Processor 404, they are physically and logically processed to expedite subsequent operations and functions. For example, the Set Processor 404 may be used to calculate component data sets resulting from direct and indirect partitioning as described above. In example embodiments, the Partition Calculation Module 435 may be included for this purpose. As described above, some components of a partition may be calculated in the background by the Partition Calculation Module 435 while the system continues to process other statements and may be passed to the Storage Manager 420 to be realized in the Data Store 425. The operations and functions of the Set Processor 404 are implemented as software routines in one example embodiment. However, such operations and functions could also be implemented partially or completely in firmware, programmable logic devices such as field programmable gate arrays (FPGAs) as referenced in FIG. 3C, System on Chips (SOCs), application specific integrated circuits (ASICs), or other hardware or a combination thereof.

The software modules shown in FIG. 4A will now be described in further detail. As shown in FIG. 4A, the software includes Set Manager 402 and Set Processor 404 as well as SQL Connector 406, SQL Translator 408, XSN Connector 410, XML Connector 412, XML Translator 414, XSN Interface 416, Optimizer 418, Storage Manager 420, Executive 422 and Administrator Interface 424. In example embodiments, the Optimizer 418 may include Partitioning Module 430 and the Set Processor 404 may include Partition Calculation Module 435 for performing direct and indirect algebraic and physical partitioning of data sets. FIG. 4A also shows Data Store 425 for storing data sets in storage 124.

Figure 4A:
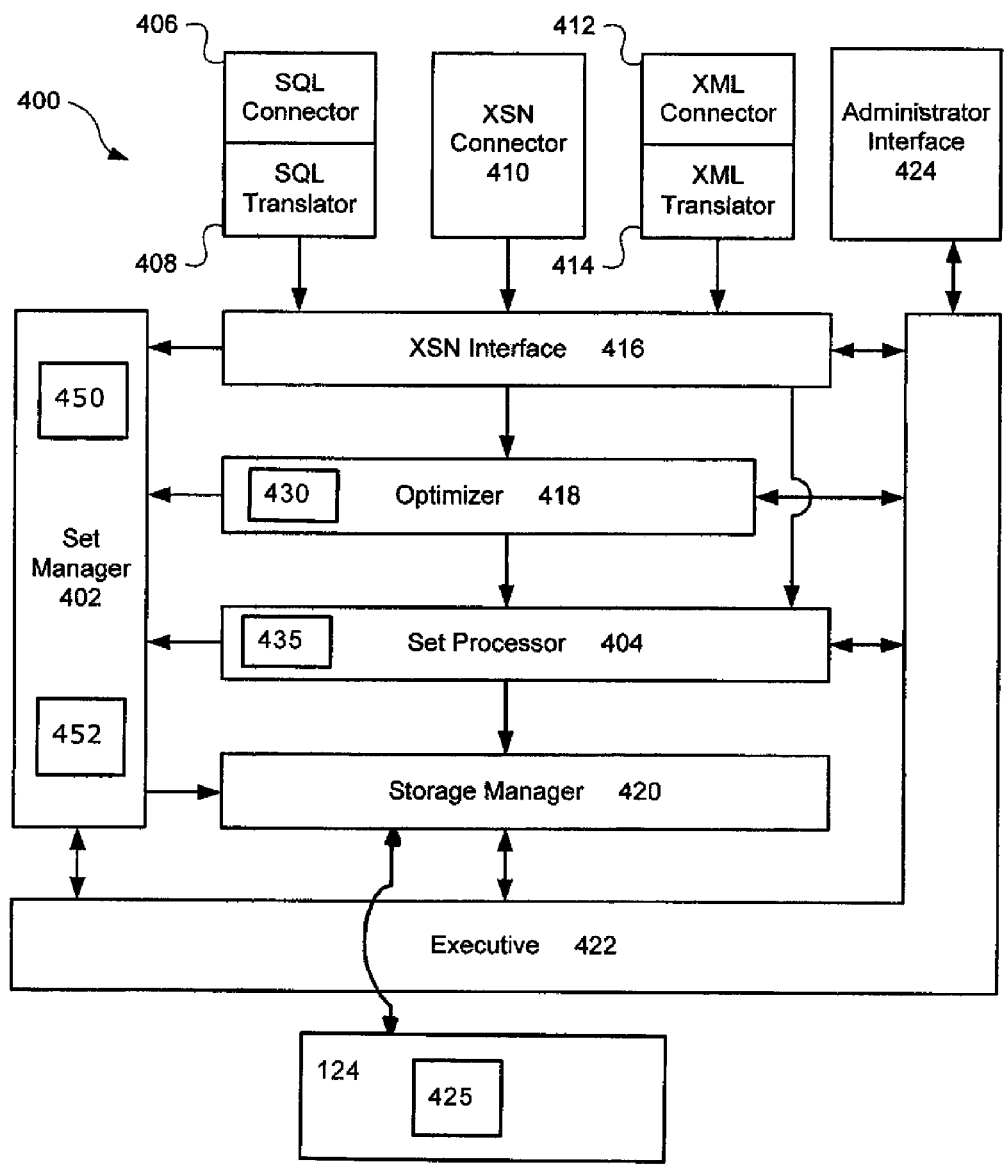
FIG. 4A is a block diagram illustrating the logical architecture of an example embodiment, including a Partitioning Module and Partition Calculation Module for direct and indirect partitioning according to an example embodiment.

In the example embodiment of FIG. 4A, queries and other statements about data sets are provided through one of three connectors, SQL Connector 406, XSN Connector 410 or XML Connector 412. Each connector receives and provides statements in a particular format. In one example, SQL Connector 406 provides a standard SQL92-compliant ODBC connector to user applications and ODBC-compliant third-party relational database systems, and XML Connector 412 provides a standard Web Services W3C XQuery-compliant connector to user applications, compliant third-party XML systems, and other instances of the software 400 on the same or other systems. SQL and XQuery are example formats for providing query language statements to the system, but other formats may also be used. Query language statements provided in these formats are translated by SQL Translator 408 and XML Translator 414 into an extended set notation (XSN) format that is used by the system. XSN Connector 410 provides a connector for receiving statements directly in an XSN format. An Example Extended Set Notation is described in the patents referenced at the beginning of this description, which are incorporated herein by reference. The Example Extended Set Notation includes a syntax in which statements regarding extended data sets may be presented to the system. The Example Extended Set Notation is an example only and other notations may be used in other embodiments. Other embodiments may also use different types and formats of data sets and algebraic relations to capture information from statements provided to the system.

XSN Interface 416 provides a single point of entry for all statements from the connectors. The statements are provided from SQL Translator 408, XML Translator 414 or XSN Connector 410 in an XSN format. The statements are provided using a text based description of extended set notation. The XSN Interface 416 provides a parser that converts the text description into an internal representation that is used by the system. In one example, the internal representation uses an XSN tree data structure. As the XSN statements are parsed, the XSN Interface 416 may call the Set Manager 402 to assign GUIDs to the data sets referenced in the statements. The overall algebraic relation representing the XSN statement may also be parsed into components that are themselves algebraic relations. In an example embodiment, these components may be algebraic relations with an expression composed of a single operation that reference from one to three data sets. Each algebraic relation may be stored in the Algebraic Cache in the Set Manager 402. A GUID may be added to the Set Universe for each new algebraic expression, representing a data set defined by the algebraic expression. The XSN Interface 416 thereby composes a plurality of algebraic relations referencing the data sets specified in statements presented to the system as well as new data sets that may be created as the statements are parsed. In example embodiments, the XSN Interface 416 may define data sets and algebraic relations based on restrictions contained in the statements, including restrictions on a data set based on constituent(s) of another data set. As described above, these restrictions may be used by Partitioning Module 430 to determine when to automatically perform direct or indirect partitioning of the restricted data set. In this manner, the XSN Interface 416 and Set Manager 402 capture information from the statements presented to the system. These data sets and algebraic relations can then be used for algebraic optimization when data sets need to be calculated by the system.

The Set Manager 402 provides a data set information store for storing information regarding the data sets known to the system, referred to as the Set Universe in this example. The Set Manager 402 also provides a relation store for storing the relationships between the data sets known to the system, referred to as the Algebraic Cache in this example. FIG. 4B illustrates the information maintained in the Set Universe 450 and Algebraic Cache 452 according to an example embodiment. Other embodiments may use a different data set information store to store information regarding the data sets or a different relation store to store information regarding algebraic relations known to the system.

Figure 4B:
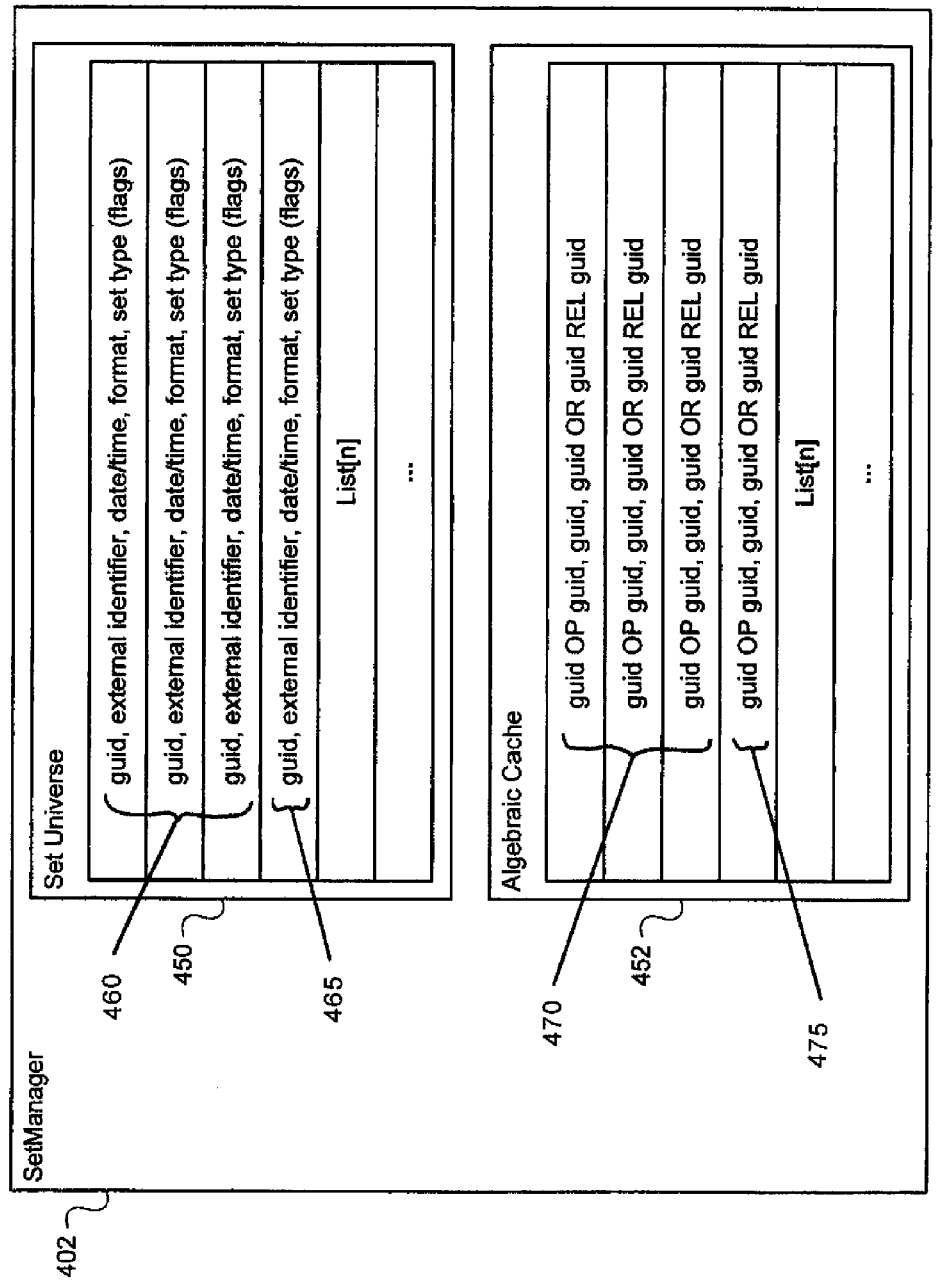
FIG. 4B is a block diagram illustrating the information stored in a set manager module of an example embodiment, including data set identifiers and algebraic relations resulting from direct and indirect partitioning according to an example embodiment.

As shown in FIG. 4B, the Set Universe 450 may maintain a list of GUIDs for the data sets known to the system. Each GUID is a unique identifier for a data set in the system. The Set Universe 450 may also associate information about the particular data set with each GUID. In particular, in example embodiments, the Set Universe 450 may store information regarding data sets that are defined as part of direct or indirect partitioning, including components data sets and partition data sets. The information in the Set Universe 450 may include, for example, an external identifier used to refer to the data set (which may or may not be unique to the particular data set) in statements provided through the connectors, a date/time indicator to indicate the time that the data set became known to the system, a format field to indicate the format of the data set, and a set type with flags to indicate the type of the data set. The format field may indicate a logical to physical translation model for the data set in the system. For example, the same logical data is capable of being stored in different physical formats on storage media in the system. The format field indicates how the logical data is mapped to the physical format on the storage media. For example, a data set may be stored on storage media in comma separated value (CSV) format, binary-string encoding (BSTR) format, fixed-offset (FIXED) format, type-encoded data (TED) format and/or markup language format. Type-encoded data (TED) is a file format that contains data and an associated value that indicates the format of such data. These are examples only and other physical formats may be used in other embodiments.

While the Set Universe stores information about the data sets, the underlying data may be stored elsewhere in this example embodiment, such as storage 124 in FIG. 3A, Network Attached Storage 204 $a$, $b$ and $c$ in FIG. 3B, memory arrays 308 $a$-$f$ in FIG. 3C or other storage. Some data sets may not exist in physical storage, but may be calculated from algebraic relations known to the system. In some cases, data sets may even be defined by algebraic relations referencing data sets that have not yet been provided to the system and cannot be calculated until those data sets are provided at some future time. The set type may indicate whether the data set is available in storage, referred to as realized, or whether it is defined by algebraic relations with other data sets, referred to as virtual. Other types may also be supported in some embodiments, such as a transitional type to indicate a data set that is in the process of being created or removed from the system. These are examples only and other information about data sets may also be stored in a data set information store in other embodiments.

As shown in FIG. 4B, the Algebraic Cache 452 may maintain a list of algebraic relations relating one data set to another. For example, the Algebraic Cache 452 may include algebraic relations composed during direct or indirect partitioning, including algebraic relations indicating that a partitioned data set is equal to the union of its components and indicating that each component is a restriction against the data set that was partitioned. In the example shown in FIG. 4B, an algebraic relation may specify that a data set is equal to an operation or function performed on one to three other data sets (indicated as "guid OP guid guid guid" in FIG. 4B). Example operations and functions include a projection function, inversion function, cardinality function, join function and restrict function. Additional examples are described at the end of this specification as part of the Example Extended Set Notation. An algebraic relation may also specify that a data set has a particular relation to another data set (indicated as "guid REL guid" in FIG. 4B). Example relational operators include equal, subset and disjoint as well as their negations, as further described at the end of this specification as part of the Example Extended Set Notation. These are examples only and other operations, functions and relational operators may be used in other embodiments, including functions that operate on more than three data sets.

The Set Manager 402 may be accessed by other modules to add new GUMS for data sets and retrieve know relationships between data sets for use in optimizing and evaluating other algebraic relations. For example, the system may receive a query language statement specifying a data set that is the intersection of a first data set A and a second data set B. The resulting data set C may be determined and may be returned by the system. In this example, the modules processing this request may call the Set Manager 402 to obtain known relationships from the Algebraic Cache for data sets A and B that may be useful in evaluating the intersection of data sets A and B. It may be possible to use known relationships to determine the result without actually retrieving the underlying data for data sets A and B from the storage system. The Set Manager 402 may also create a new GUID for data set C and store its relationship in the Algebraic Cache (i.e., data set C is equal to the intersection of data sets A and B). Once this relationship is added to the Algebraic Cache, it is available for use in future optimizations and calculations. All data sets and algebraic relations may be maintained in the Set Manager 402 to provide temporal invariance. The existing data sets and algebraic relations are not deleted or altered as new statements are received by the system. Instead, new data sets and algebraic relations are composed and added to the Set Manager 402 as new statements are received. For example, if data is requested to be removed from a data set, a new GUID can be added to the Set Universe and defined in the Algebraic Cache as the difference of the original data set and the data to be removed. As described above, this approach can be used to add or delete data, without requiring data to be added or deleted to particular physical components in the Data Store 425 even when data sets have been physically partitioned and the original data set is no longer realized in the Data Store 425.

The Optimizer 418 receives algebraic expressions from the XSN Interface 416 and optimizes them for calculation. When a data set needs to be calculated (e.g., for purposes of realizing it in the storage system or returning it in response to a request from a user), the Optimizer 418 retrieves an algebraic relation from the Algebraic Cache that defines the data set. The Optimizer 418 can then generate a plurality of collections of other algebraic relations that define an equivalent data set. Algebraic substitutions may be made using other algebraic relations from the Algebraic Cache and algebraic operations may be used to generate relations that are algebraically equivalent. In one example embodiment, all possible collections of algebraic relations are generated from the information in the Algebraic Cache that define a data set equal to the specified data set. As described above, the collections of algebraic relations may include algebraic relations composed from the statements received by the system as well as other algebraic relations that were not composed from those statements. In example embodiments, the collections of algebraic relations may include algebraic relations composed from direct and indirect algebraic partitioning as well as other algebraic relations (including algebraic relations composed from the statements received by the system and/or other algebraic relations that were not composed from those statements).

The Optimizer 418 may then determine an estimated cost for calculating the data set from each of the collections of algebraic relations. The cost may be determined by applying a costing function to each collection of algebraic relations, and the lowest cost collection of algebraic relations may be used to calculate the specified data set. In one example embodiment, the costing function determines an estimate of the time required to retrieve the data sets from storage that are required to calculate each collection of algebraic relations and to store the results to storage. If the same data set is referenced more than once in a collection of algebraic relations, the cost for retrieving the data set may be allocated only once since it will be available in memory after it is retrieved the first time. In this example, the collection of algebraic relations requiring the lowest data transfer time is selected for calculating the requested data set.

The Optimizer 418 may generate different collections of algebraic relations that refer to the same logical data stored in different physical locations over different data channels and/or in different physical formats. While the data may be logically the same, different data sets with different GUIDs may be used to distinguish between the same logical data in different locations or formats. The different collections of algebraic relations may have different costs, because it may take a different amount of time to retrieve the data sets from different locations and/or in different formats. For example, the same logical data may be available over the same data channel but in a different format. Example formats may include comma separated value (CSV) format, binary-string encoding (BSTR) format, fixed-offset (FIXED) format, type-encoded data (TED) format and markup language format. Other formats may also be used. If the data channel is the same, the physical format with the smallest size (and therefore the fewest number of bytes to transfer from storage) may be selected. For instance, a comma separated value (CSV) format is often smaller than a fixed-offset (FIXED) format. However, if the larger format is available over a higher speed data channel, it may be selected over a smaller format. In particular, a larger format available in a high speed, volatile memory such as a DRAM would generally be selected over a smaller format available on lower speed non-volatile storage such as a disk drive or flash memory.

In this way, the Optimizer 418 takes advantage of high processor speeds to optimize algebraic relations without accessing the underlying data for the data sets from data storage. Processor speeds for executing instructions are often higher than data access speeds from storage. By optimizing the algebraic relations before they are calculated, unnecessary data access from storage can be avoided. The Optimizer 418 can consider a large number of equivalent algebraic relations and optimization techniques at processor speeds and take into account the efficiency of data accesses that will be required to actually evaluate the expression. For instance, the system may receive a query requesting data that is the intersection of data sets A, B and D. The Optimizer 418 can obtain known relationships regarding these data sets from the Set Manager 402 and optimize the expression before it is evaluated. For example, it may obtain an existing relation from the Algebraic Cache indicating that data set C is equal to the intersection of data sets A and B. Instead of calculating the intersection of data sets A, B and D, the Optimizer 418 may determine that it would be more efficient to calculate the intersection of data sets C and D to obtain the equivalent result. In making this determination, the Optimizer 418 may consider that data set C is smaller than data sets A and B and would be faster to obtain from storage or may consider that data set C had been used in a recent operation and has already been loaded into higher speed memory or cache.

The Optimizer 418 may also continually enrich the information in the Set Manager 402 via submissions of additional relations and sets discovered through analysis of the sets and Algebraic Cache. This process is called comprehensive optimization. For instance, the Optimizer 418 may take advantage of unused processor cycles to analyze relations and data sets to add new relations to the Algebraic Cache and sets to the Set Universe that are expected to be useful in optimizing the evaluation of future requests. For example, the Partitioning Module 430 may analyze the Algebraic Cache 452 for patterns of restrictions that meet the conditions for direct or indirect partitioning and may automatically perform direct or indirect algebraic partitioning when the conditions are met. New data sets and algebraic relations may be added to the Set Universe and Algebraic Cache and may also be provided to the Set Processor 404 and Partition Calculation Module 435 to be calculated. Once the relations have been entered into the Algebraic Cache, even if the calculations being performed by the Set Processor 404 are not complete, the Optimizer 418 can make use of them while processing subsequent statements. There are numerous algorithms for comprehensive optimization that may be useful. These algorithms may be based on the discovery of repeated calculations on a limited number of sets that indicate a pattern or trend of usage emerging over a recent period of time, such as a pattern of restrictions triggering direct or indirect partitioning as described above.

The Set Processor 404 actually calculates the selected collection of algebraic relations after optimization. The Set Processor 404 provides the arithmetic and logical processing required to realize data sets specified in algebraic extended set expressions. In an example embodiment, the Set Processor 404 provides a collection of functions that can be used to calculate the operations and functions referenced in the algebraic relations. The collection of functions may include functions configured to receive data sets in a particular physical format. In this example, the Set Processor 404 may provide multiple different algebraically equivalent functions that operate on data sets and provide results in different physical formats. The functions that are selected for calculating the algebraic relations correspond to the format of the data sets referenced in those algebraic relations (as may be selected during optimization by the Optimizer 418). In example embodiments, the Set Processor 404 is capable of parallel processing of multiple simultaneous operations, and, via the Storage Manager 420, allows for pipelining of data input and output to minimize the total amount of data that is required to cross the persistent/volatile storage boundary. In particular, the algebraic relations from the selected collection may be allocated to various processing resources for parallel processing. These processing resources may include processor 102 and accelerator 122 shown in FIG. 3A, distributed computer systems as shown in FIG. 3B, multiple processors 302 and MAPs 306 as shown in FIG. 3C, or multiple threads of execution on any of the foregoing. These are examples only and other processing resources may be used in other embodiments.

The Executive 422 performs overall scheduling of execution, management and allocation of computing resources, and proper startup and shutdown.

Administrator Interface 424 provides an interface for managing the system. In example embodiments, this may include an interface for importing or exporting data sets. While data sets may be added through the connectors, the Administrator Interface 424 provides an alternative mechanism for importing a large number of data sets or data sets of very large size. Data sets may be imported by specifying the location of the data sets through the interface. The Set Manager 402 may then assign a GUID to the data set. However, the underlying data does not need to be accessed until a request is received that requires the data to be accessed. This allows for a very quick initialization of the system without requiring data to be imported and reformatted into a particular structure. Rather, relationships between data sets are defined and added to the Algebraic Cache in the Set Manager 402 as the data is actually queried. As a result, optimizations are based on the actual way the data is used (as opposed to predefined relationships built into a set of tables or other predefined data structures).

Example embodiments may be used to manage large quantities of data. For instance, the data store may include more than a terabyte, one hundred terabytes or a petabyte of data or more. The data store may be provided by a storage array or distributed storage system with a large storage capacity. The data set information store may, in turn, define a large number of data sets. In some cases, there may be more than a million, ten million or more data sets defined in the data information store. In one example embodiment, the software may scale to $2^{64}$ data sets, although other embodiments may manage a smaller or larger universe of data sets. Many of these data sets may be virtual and others may be realized in the data store. The entries in the data set information store may be scanned from time to time to determine whether additional data sets should be virtualized or whether to remove data sets to temporally redefine the data sets captured in the data set information store. The relation store may also include a large number of algebraic relations between data sets. In some cases, there may be more than a million, ten million or more algebraic relations included in the relation store. In some cases, the number of algebraic relations may be greater than the number of data sets. The large number of data sets and algebraic relations represent a vast quantity of information that can be captured about the data sets in the data store and allow extended set processing and algebraic optimization to be used to efficiently manage extremely large amounts of data. The above are examples only and other embodiments may manage a different number of data sets and algebraic relations.

While example embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A computer system comprising:
   (a) at least one processor;
   (b) at least one memory, wherein the at least one memory includes a relation store for storing a plurality of algebraic relations;
   (c) a storage system, including a data store for storing a plurality of data sets; and
   (d) at least one program module, the program module stored in the memory and configured to be executed by the processor, including:
   instructions for composing a plurality of algebraic relations between data sets;
   instructions for storing the plurality of algebraic relations in the relation store;
   instructions for receiving a first statement referencing a first data set and a second data set;
   instructions for determining whether the first statement specifies at least one constituent of the first data set for restricting the second data set, wherein the constituent is not included in the second data set;

instructions for determining whether a condition for indirect partitioning of the second data set based on the constituent of the first data set is satisfied;

instructions for automatically defining component data sets if the condition for indirect partitioning is satisfied, wherein each component data set includes a distinct component of the second data set defined, at least in part, by a selection criteria based on the constituent of the first data set;

instructions for storing in the relation store, for each component data set, at least one algebraic relation referencing the respective component data set;

instructions for receiving a second statement that requests a requested data set; and instructions for providing the requested data set, including:

instructions for composing a collection of algebraic relations defining a result equal to the requested data set, including at least one algebraic relation from the relation store that references at least one of the component data sets; and instructions for calculating the requested data set using the collection of algebraic relations.

2. The computer system of claim 1 wherein the instructions for determining the condition for indirect partitioning include instructions for evaluating a relationship between the first data set and the second data set.

3. The computer system of claim 1 wherein the instructions for determining the condition for indirect partitioning include instructions for determining whether a relationship between the first data set and the second data set is a one-to-one or one-to-many relationship.

4. The computer system of claim 1 wherein the instructions for determining the condition for indirect partitioning include instructions for determining whether a relationship between the first data set and the second data set is based on a key for the first data set.

5. The computer system of claim 1 wherein the instructions for determining the condition for indirect partitioning include instructions for determining whether a relationship between the first data set and the second data set is based on a constituent of the first data set that is distinct for each member of the first data set.

6. The computer system of claim 1 wherein the instructions for determining the condition for indirect partitioning include instructions for determining whether the relation store includes at least a threshold number of algebraic relations that restrict the second data set based on the constituent of the first data set.

7. The computer system of claim 6 wherein the threshold number is at least two.

8. The computer system of claim 1 wherein the instructions for determining the condition for indirect partitioning include instructions for identifying a pattern of restrictions of the second data set based on the constituent of the first data set.

9. The computer system of claim 1 wherein the instructions for determining the condition for indirect partitioning include instructions for identifying a pattern of restrictions against the second data set having the same logical structure as the restriction specified by the first statement.

10. The computer system of claim 1 wherein the instructions for determining the condition for indirect partitioning include instructions for determining that the second data set is larger than a threshold size.

11. The computer system of claim 1 wherein the instructions for automatically defining component data sets include instructions for joining the first data set and the second data set.

12. The computer system of claim 11 wherein the instructions for automatically defining component data sets include instructions for removing elements of the first data set from the joined data set.

13. The computer system of claim 11 wherein the instructions for automatically defining component data sets include instructions for partitioning the joined data set based, at least in part, on distinct ranges applied to the constituent of the first data set.

14. The computer system of claim 12 wherein the instructions for automatically defining component data sets include instructions for partitioning the joined data set based, at least in part, on distinct ranges applied to the constituent of the first data set.

15. The computer system of claim 1 wherein the instructions for composing the collection of algebraic relations include instructions for selecting at least one component data set to reference in the collection of algebraic relations by intersecting a restriction composed from the second statement with the collection of component data sets.

16. The computer system of claim 1 wherein the instructions for providing the requested data set include instructions for composing and evaluating a plurality of alternative collections of algebraic relations defining a result equal to the requested data set, wherein at least one of the alternative collections includes at least one algebraic relation from the relation store that references at least one of the component data sets.

17. The computer system of claim 1 wherein the instructions for providing the requested data set include instructions for calculating at least one of the component data sets.

18. The computer system of claim 17 further comprising instructions for realizing the component data set in the data store.

19. The computer system of claim 1 further comprising instructions for realizing each of the component data sets in the data store.

20. The computer system of claim 19 wherein the instructions for realizing each of the component data sets in the data store include instructions for calculating at least some of the component data sets as part of a background process.

21. The computer system of claim 1 wherein the instructions for composing the plurality of algebraic relations include instructions for composing algebraic relations from a plurality of statements received by the system over time.

22. The computer system of claim 1 further comprising instructions for indirectly partitioning the second data set into a collection of different component data sets.

23. The computer system of claim 1 further comprising instructions for indirectly partitioning the second data set based on at least one constituent of a third data set, wherein the constituent of the third data set is not included in the first data set or the second data set.

24. The computer system of claim 23, further comprising instructions for determining that there is a one-to-one or one-to-many relationship between members of the third data set and the members of the second data set.

25. The computer system of claim 1 further comprising instructions for indirectly partitioning a third data set based, at least in part, on the constituent of the first data set, further comprising instructions for determining that there is a one-to-one or one-to-many relationship between members of the second data set and the members of the third data set.

26. The computer system of claim 1 further comprising instructions for indirectly partitioning a plurality of other data sets.

27. The computer system of claim 1 further comprising instructions for directly partitioning the first data set based on the constituent of the first data set.

28. The computer system of claim 14 further comprising instructions for partitioning the first data set based, at least in part, on the distinct ranges applied to the constituent of the first data set.

29. The computer system of claim 1 further comprising instructions for:
- defining at least one partition data set based on the component data sets, wherein the partition data set has a higher mathematical class than the second data set; and
- adding at least one algebraic relation referencing the partition data set to the relation store;
- wherein the instructions for providing the requested data set further comprise instructions for using the algebraic relation referencing the partition data set to compose the collection of algebraic relations.

30. The computer system of claim 29 wherein the second data set is a clan and the partition data set is a hoard.

31. A computer-program product for use in conjunction with a computer system, the computer-program product comprising a non-transitory computer-readable storage medium and a computer-program mechanism embedded therein, including:
- instructions for composing a plurality of algebraic relations between data sets;
- instructions for storing the plurality of algebraic relations in a relation store;
- instructions for receiving a first statement referencing a first data set and a second data set;
- instructions for determining whether the first statement specifies at least one constituent of the first data set for restricting the second data set, wherein the constituent is not included in the second data set;
- instructions for determining whether a condition for indirect partitioning of the second data set based on the constituent of the first data set is satisfied;
- instructions for automatically defining component data sets if the condition for indirect partitioning is satisfied, wherein each component data set includes a distinct component of the second data set defined, at least in part, by a selection criteria based on the constituent of the first data set;
- instructions for storing in the relation store, for each component data set, at least one algebraic relation referencing the respective component data set;
- instructions for receiving a second statement that requests a requested data set; and
- instructions for providing the requested data set, including:
  - instructions for composing a collection of algebraic relations defining a result equal to the requested data set, including at least one algebraic relation from the relation store that references at least one of the component data sets; and
  - instructions for calculating the requested data set using the collection of algebraic relations.

32. A computer implemented method for partitioning a data set comprising:
- composing a plurality of algebraic relations between data sets;
- storing the plurality of algebraic relations in a relation store;
- receiving a first statement referencing a first data set and a second data set;
- determining, by a computer, whether the first statement specifies at least one constituent of the first data set for restricting the second data set, wherein the constituent is not included in the second data set;
- determining, by the computer, whether a condition for indirect partitioning of the second data set based on the constituent of the first data set is satisfied;
- automatically defining, by the computer, component data sets if the condition for indirect partitioning is satisfied, wherein each component data set includes a distinct component of the second data set defined, at least in part, by a selection criteria based on the constituent of the first data set;
- storing in the relation store, for each component data set, at least one algebraic relation referencing the respective component data set;
- receiving a second statement that requests a requested data set; and
- providing the requested data set, including:
  - composing, by the computer, a collection of algebraic relations defining a result equal to the requested data set, including at least one algebraic relation from the relation store that references at least one of the component data sets; and
  - calculating, by the computer, the requested data set using the collection of algebraic relations.

* * * * *